Nov. 2, 1965 S. FINDEIS 3,215,011
AUTOMATICALLY CONTROLLED MACHINE
Filed Aug. 21, 1961 14 Sheets-Sheet 1

INVENTOR.
STEPHAN FINDEIS
BY E. M. Squire
his attorney

INVENTOR.
STEPHAN FINDEIS
BY E.M. Squire
his attorney

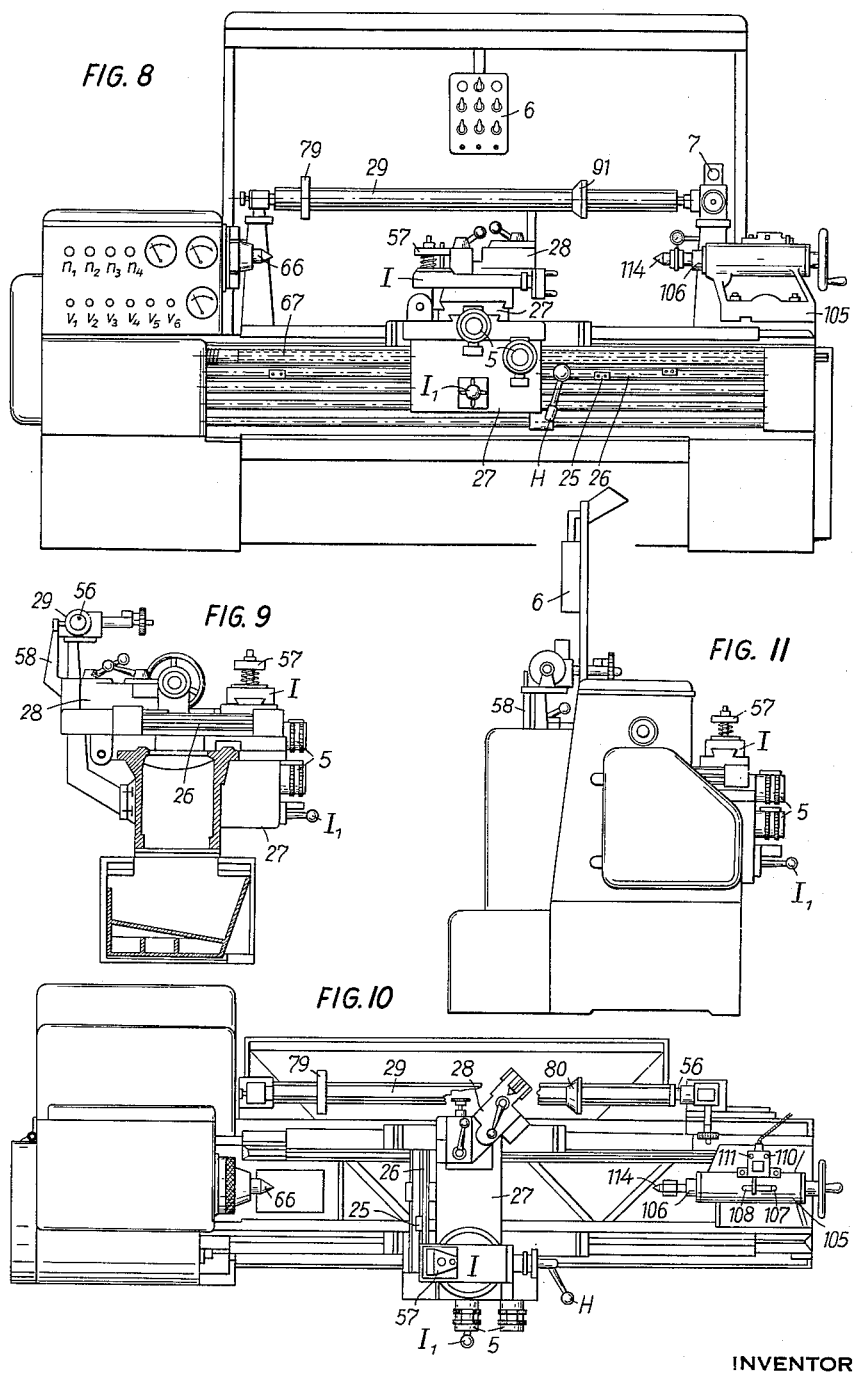

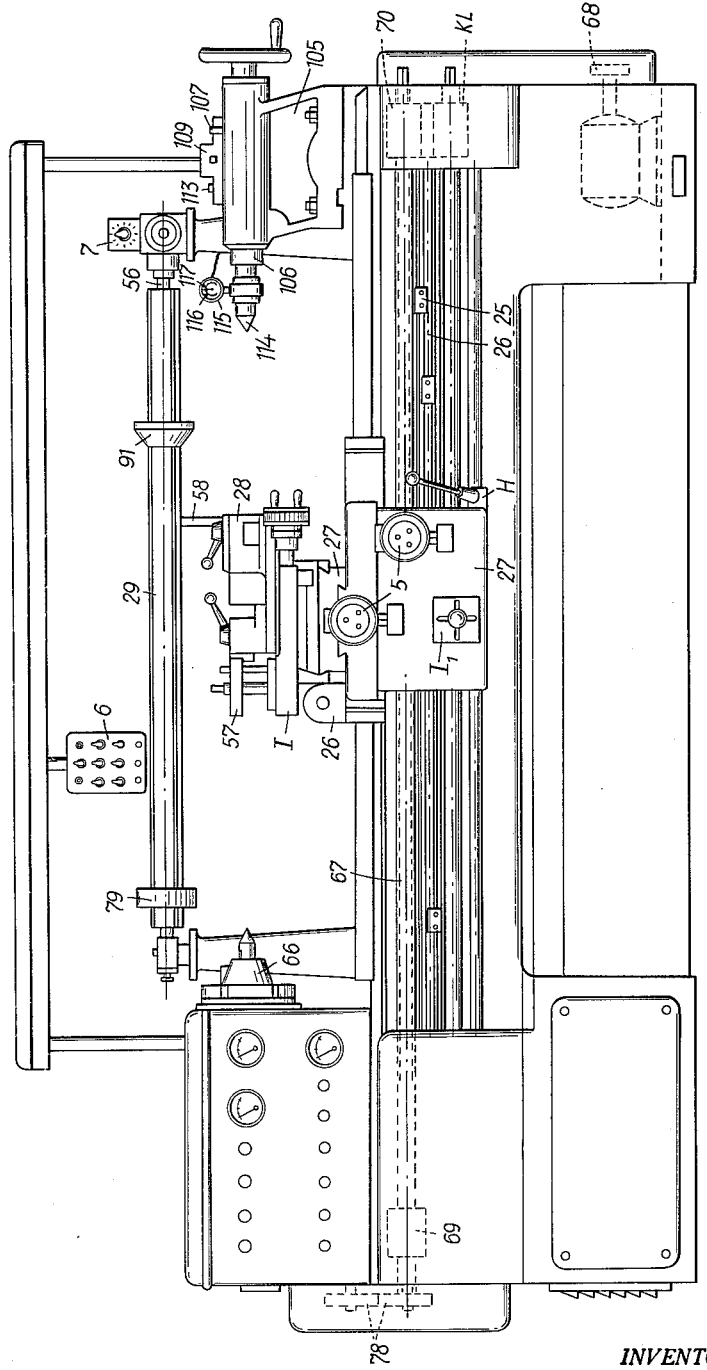

Nov. 2, 1965 S. FINDEIS 3,215,011
AUTOMATICALLY CONTROLLED MACHINE
Filed Aug. 21, 1961 14 Sheets-Sheet 5
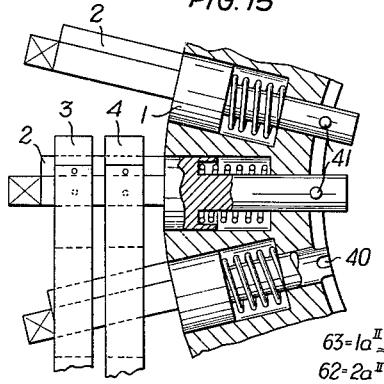
FIG. 15
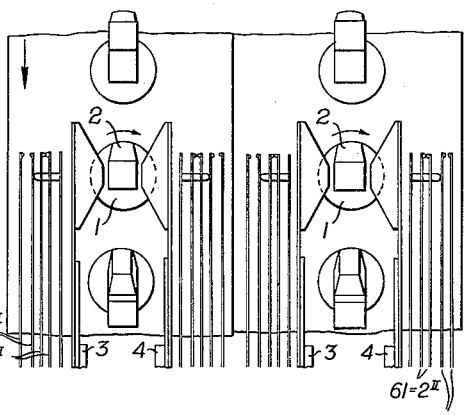
FIG. 16
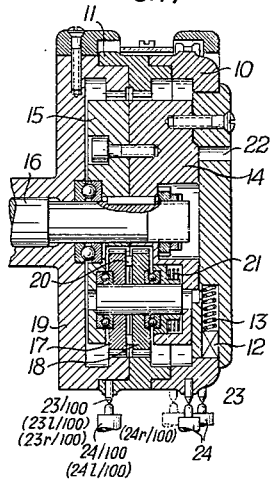
FIG. 17
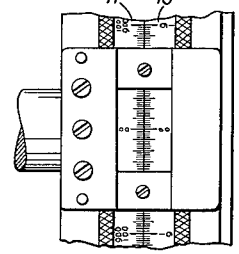
FIG. 18
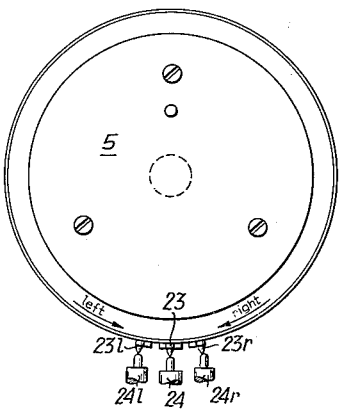
FIG. 19
FIG. 20
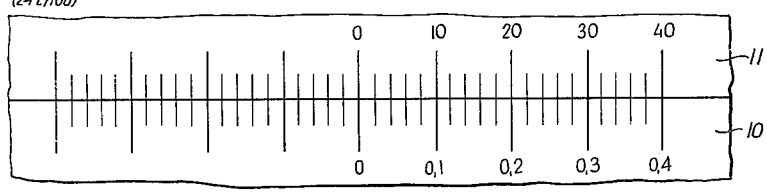
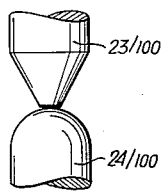
FIG. 21
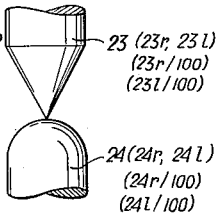
FIG. 22
INVENTOR.
STEPHAN FINDEIS
BY
E. M. Squire
his attorney Nov. 2, 1965 S. FINDEIS 3,215,011
AUTOMATICALLY CONTROLLED MACHINE
Filed Aug. 21, 1961 14 Sheets-Sheet 6
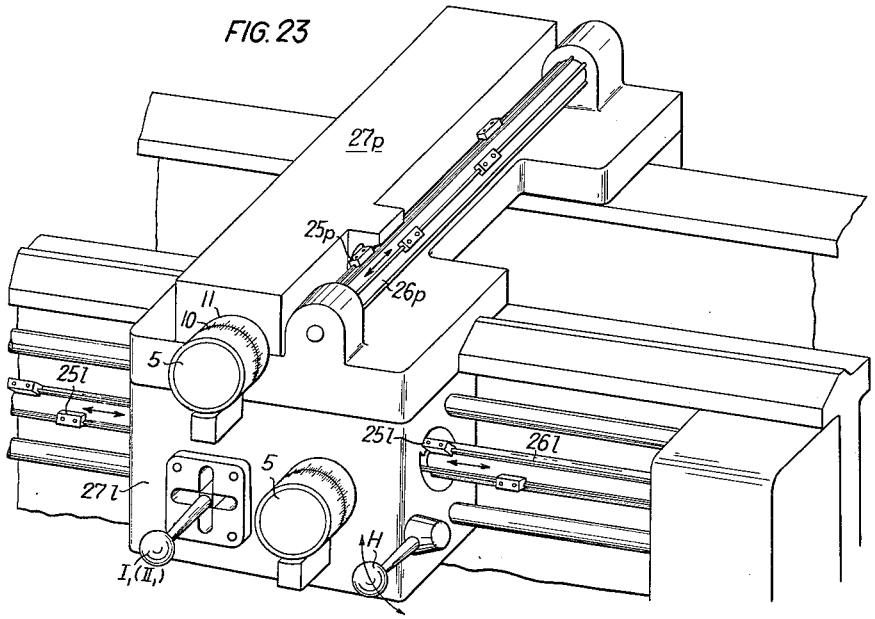
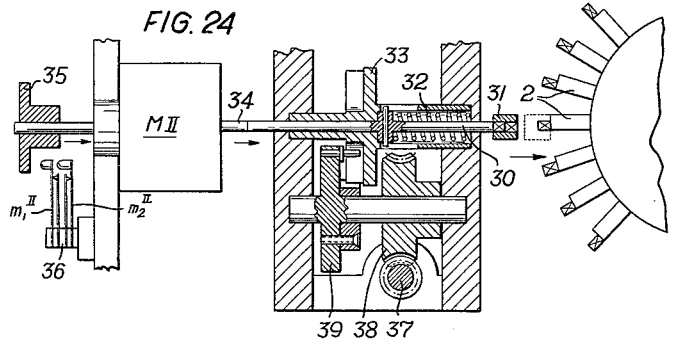
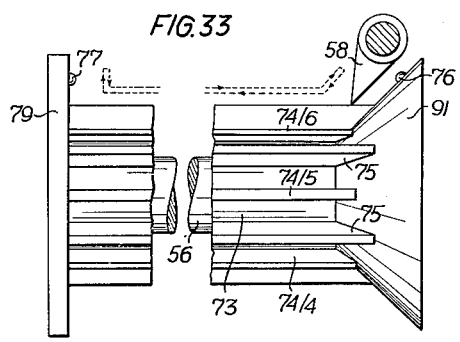
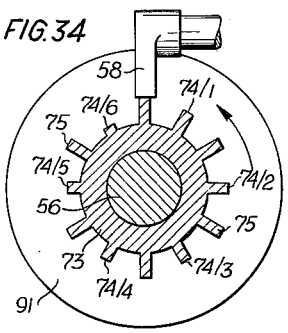
INVENTOR.
STEPHAN FINDEIS
BY E. M. Squire
his attorney Nov. 2, 1965  S. FINDEIS  3,215,011
AUTOMATICALLY CONTROLLED MACHINE
Filed Aug. 21, 1961  14 Sheets-Sheet 7
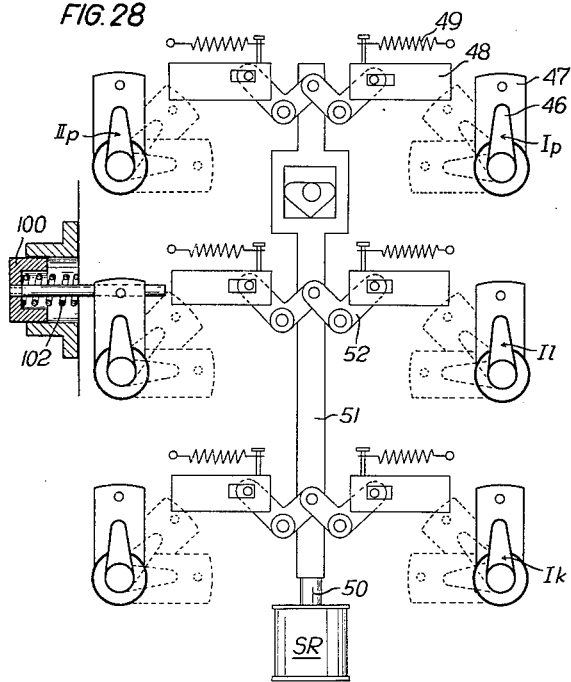
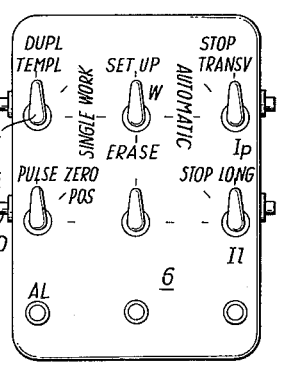
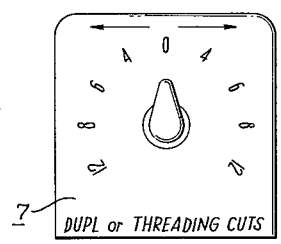
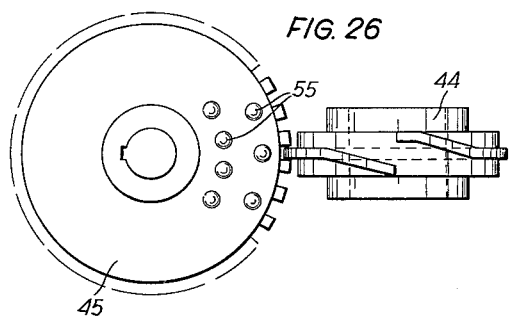
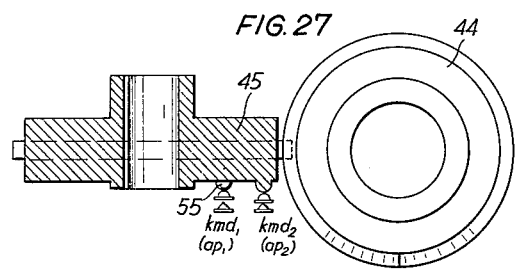
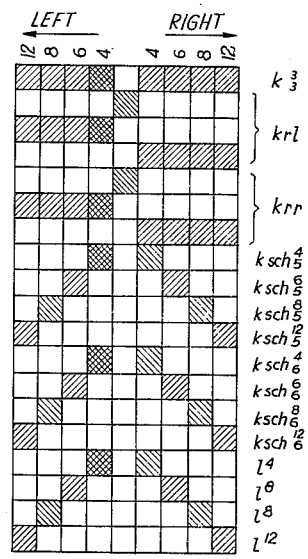
INVENTOR.
STEPHAN FINDEIS
BY E. M. Squire
his attorney Nov. 2, 1965 S. FINDEIS 3,215,011
AUTOMATICALLY CONTROLLED MACHINE
Filed Aug. 21, 1961 14 Sheets-Sheet 9

INVENTOR:
STEPHAN FINDEIS
BY
Squire & Olcott
ATTY's.

Nov. 2, 1965 S. FINDEIS 3,215,011
AUTOMATICALLY CONTROLLED MACHINE
Filed Aug. 21, 1961 14 Sheets-Sheet 11

INVENTOR:
STEPHAN FINDEIS
BY
Squire & Olcott
Attys.

INVENTOR:
STEPHAN FINDEIS
BY
Squire + Olcott
Attys.

Nov. 2, 1965  S. FINDEIS  3,215,011
AUTOMATICALLY CONTROLLED MACHINE
Filed Aug. 21, 1961  14 Sheets-Sheet 14

INVENTOR.
STEPHAN FINDEIS
BY E. M. Squire
his attorney

United States Patent Office 3,215,011
Patented Nov. 2, 1965

3,215,011
AUTOMATICALLY CONTROLLED MACHINE
Stephan Findeis, Muldenstrasse 24, Linz, Austria
Filed Aug. 21, 1961, Ser. No. 132,704
17 Claims. (Cl. 82—14)

The constant efforts toward the provision of machines for performing an automatic sequence of operations always encounter the difficulty which is involved in the establishment of the automatic sequence of operation. In known control systems, the working cycle must be determined in advance and the controlling elements, such as control cams in the case of mechanically controlled automatic devices or punched cards and sets of contact cams in electrical control systems had to be manufactured and prepared. These systems have the disadvantage that in addition to a certain, inevitable expenditure of time, they require also a certain specialized training of the planning and setting-up personnel. This imposes severe restrictions on the general use of such automatically operating machines and makes them profitable in general only for very large quantities or series. Another important disadvantage resides in that any changes in the operation or sequence of operation will require a complete change of the sets of control cams in mechanical control systems or of the punched cards or sets of switch cams in electrical control systems so that prolonged interruptions during setting up are inevitable. An automatic setting up of the control requires that the operator of the machine is enabled to the operation, which is being performed, recorded by the machine without mental activity diverting him from his setting-up work. Further, the first workpiece should already have the correct dimensions that are to be obtained in the automatic sequence of operations and means which enable this must be provided. This is particularly important for small shops, which cannot afford the large expenditure involved in additional preparatory work or equipment.

This invention relates to apparatus for automatically recording one or more sequences of operation in an electrical control system and its essential feature resides in that means for controlling the elements of the machine, such as the work tables, tool suports, workpiece supports and the like are arranged to constitute means which cause the sequences of operation to be recorded by the electrical control system so that the recording is effected during the performance of the first operation, e.g., the manufacture of a pattern true to size. Within the scope of the invention, multi-path and/or multi-position levers which serve for controlling the elements of the machine in non-automatic operation are arranged to effect directly or indirectly the switching of electrical control devices which serve to operate, e.g., to set or re-set, e.g., switching devices of an electric, mechanical or hydraulic control system by means of an intermittent mechanism, locking means and clutches. The multi-path and/or multi-position levers have a main switch and an operation-selecting switch associated with them according to the invention. It is further contemplated according to the invention that the electrical control system is arranged as a central controller, which comprises rotatable switching or control means, such as contact cams, which cooperate with contact-making devices, such as sets of springs. It is further contemplated according to the invention to provide a transmission for advancing the central controller and to control said transmission by a contacting device associated with the switching devices.

The feature of the invention that the devices for controlling the movement of the tool support or working table are used simultaneously and without change in position for setting the central controller, ensures an automatic recording without intermediate functions or intermediate operations of mental or mechanical character. As a result, the need for a separate setting of a controller, which might lead to errors, is eliminated. In addition, the need for preparing working schedules is largely eliminated and the need for the preparation of the control devices required for this purpose is entirely eliminated. These control devices may consist of cam wheels in strictly mechanically controlled automatic equipment and of punched cards, sets of switch cams etc. in electrical control systems. In hydraulically controlled automatic equipment, central controllers are also used and the control elements are manually inserted or adjusted. Even electronically controlled machines require complicated devices for predetermining the sequence of operations.

The invention is also applicable, however, to control systems using punched cards. In this case, the punching may be automatically performed and derived from the manual control device. The predetermination of the dimensions, enabled according to the invention, during setting up and the dimensional accuracy of the workpiece obtained when setting up with respect to the duplicate workpiece is a result that has not been achieved so far except with very expensive means. These expensive means are scarcely accepted by industry because they do not appear to amortize sufficiently. The invention provides a simple, very inexpensive solution, which has a very wide field of application.

Representative prior art underlying the invention and details of the invention will be explained more fully with reference to the accompanying drawings, which illustrate diagrammatically and by way of example various embodiments and applications.

FIGS. 1 to 7 illustrate a known arrangement for controlling a machine tool, FIGS. 8 to 34 show mechanical arrangements embodying the invention and FIGS. 35 to 53 show electrical circuit diagrams. Specifically, FIG. 1 is an elevation, partly in section, showing a stop barrel with its bearing and drive means, FIG. 2 is a side elevation showing the drive means of FIG. 1, FIG. 3 is a sectional view taken on line III—III of FIG. 2, FIGS. 4 and 5, respectively, are a side elevation and an end view showing the design and mounting of stops on the stop barrels, FIG. 6 is a circuit diagram of the control apparatus, and FIG. 7 a circuit diagram of a multi-position switch for controlling different functions of one and the same machine tool, FIG. 8 is a front elevation showing a lathe having a duplicating device and provided with an apparatus according to the invention, FIG. 9 is a sectional side elevation, FIG. 10 is a top plan view, FIG. 11 is a fragmentary sectional view, FIG. 12 is an enlarged front elevation showing a setting-up control desk, FIG. 13 is an enlarged front elevation showing a barrel-type switch, FIG. 14 is an enlarged front elevation showing the same lathe, FIG. 15 is a side elevation, and FIG. 16 a front elevation showing switch pins and switch cams for automatically recording a sequence of operations in a central controller.

FIG. 17 is a longitudinal sectional view,

FIG. 18 a fragmentary elevation, and

FIG. 19 an end view showing a differential vernier for setting dimensions.

FIGS. 20, 21 and 22 show details of said vernier.

FIG. 23 is a perspective view showing control elements for recording a sequence of operations into the control system of a machine.

FIG. 24 is a side elevation, partly in section, showing an intermittent mechanism for rotating the switch pins or switch cams to record a sequence of operations in the central controller.

FIG. 25 is a top plan view showing a detail of FIG. 24.

FIGS. 26 and 27 show a mechanism for the exact rotary adjustment of the rotatable parts of the control system.

FIG. 28 shows an arrangement of switches for the automatic setting of auxiliary functions for two slide rests.

FIG. 29 shows such an arrangement for a slide rest having a duplicating device.

FIGS. 31 and 32 are an elevation and a diagram, respectively, illustrating a barrel-type switch.

FIGS. 33 and 34 are side and end elevations, respectively, of a duplicating device.

FIG. 48 illustrates circuitry for blocking movement during the rotation of stops or the like.

Figure 1:
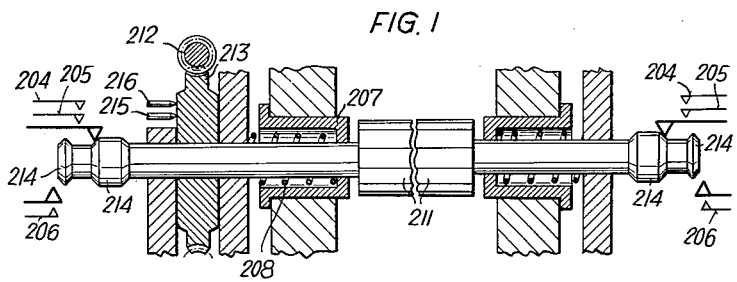
Figure 2:
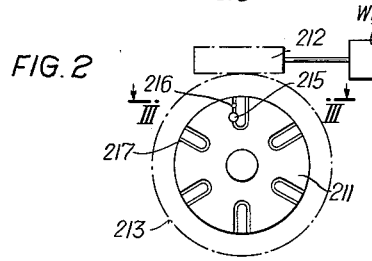
Figure 3:
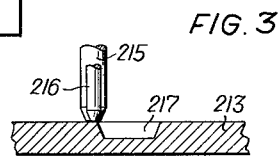

FIGS. 1 to 7 correspond to FIGS. 1 to 5 and 8, 9 of the Austrian patent specification No. 186,086 issued July 10, 1956, and the following description of these drawings follows closely the description given in said prior publication:

The stop barrel 211 shown in FIGS. 1 to 3 is rotatably mounted and driven, e.g., by a motor WM by means of a worm 212 and a worm wheel 213. The stop barrel 211 is axially movable due to the provision of springs 208 and spring retaining caps 207, the latter serving for limiting the longitudinal displacement relative to the rotary bearings of the stop barrels or stationary stops. The ends of the stop barrels 211 are provided, e.g., with cam faces 214, which coact with the contacts 204, 205 and 206 of the pulse generator. The contacts are operated by longitudinal displacements of the stop barrels 211, which tend to return to their position of rest under the action of the springs 208.

The stop barrels 211 are mounted for displacement parallel to the paths of movement of the machine elements to be controlled and are formed with suitably dovetail-shaped longitudinal grooves, in which stops for coacting with the machine elements are displaceably mounted.

Figure 4:
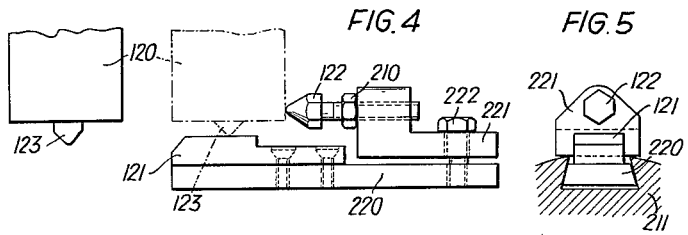
Figure 5:
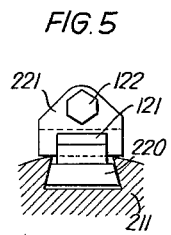

These stop assemblies, which are shown on a larger scale in FIGS. 4 and 5, comprise clamping plates 220, which have a tapered cross-section corresponding to the dovetail grooves. Stop members 221 are secured by screws 222 to the clamping plates 220 and serve at the same time for clamping the clamping plates 220 in the dovetail grooves. Stop screws 122 are in threaded engagement with the stop members 221 and locked with nuts 210. The use of these stop screws 122 enables a fine adjustment. The stop screws 122 cooperate with a stop 120 attached to one of the machine elements to be controlled. This cooperation results in a longitudinal displacement of the stop barrel 211 and an actuation of the contacts 204, 205, 206 by the cam faces 214.

Switch-actuating cams 121 are secured to the clamping plates 220 suitably with screws and coact with a switching pin 123 arranged in the stops 120. The cams 121 and the switching pin 123 serve for effecting a change-over from a high-speed motion to a feed motion as will be described hereinafter.

As is apparent from FIGS. 2 and 3, the end faces of the worm wheel 213 are formed with grooves 217 of wedge-shaped cross-section and equal in number to the number of the dovetail grooves on the stop barrels 211. Switching pins 215, 216 cooperate with these wedge-shaped grooves 217 to control the drive motor WM as will be described hereinafter.

Figure 6:
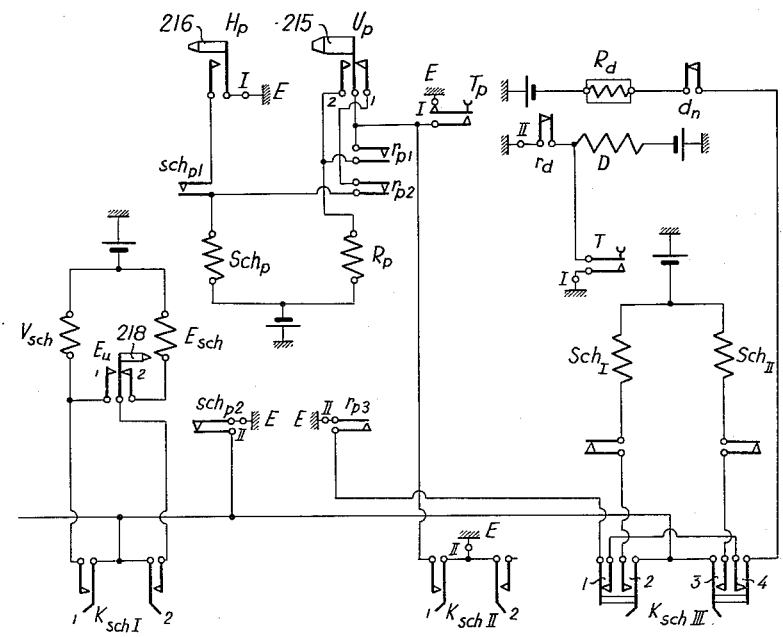
Figure 7:
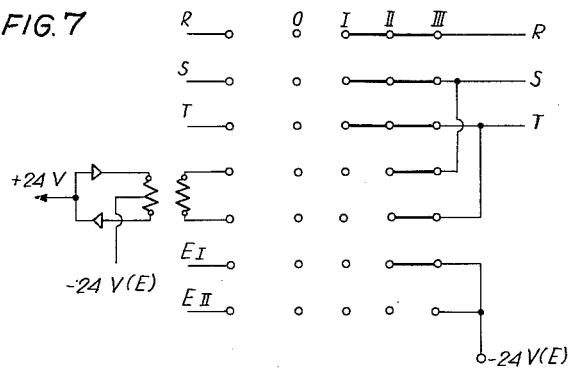

In the circuit diagram shown in FIG. 6, the switches $K_{sch\,I}$, $K_{sch\,II}$, $K_{sch\,III}$ are arranged in the central controller. The switch $K_{sch\,I}$ serves for controlling the relays $V_{sch}$, $E_{sch}$ for controlling the feed and high-speed motions, respectively. The switch $K_{sch\,II}$ serves for controlling the relays $Sch_p$ and $R_p$ for controlling the drive motor WM for stepping the stop barrels 211. The switch $K_{sch\,III}$ serves for controlling the feed motor by means of the contactors $Sch_I$ and $Sch_{II}$.

The apparatus described with reference to FIGS. 1 to 6 has the following mode of operation:

*Stepping of the stop barrel*

The rotation of the stop barrel 211 is initiated by the pair of contact springs 1 of the switch $K_{sch\,II}$, which is closed when the controlling elements of the central controller are in an appropriate position. Closing the contacts $K_{sch\,II}1$ completes a circuit from ground E through the contact $U_p1$, a break contact $r_{p2}$ of the relay $R_p$ and the relay $Sch_p$ to the battery. As a result, the relay $Sch_p$ causes the energization of the motor WM, the connections of which are not shown in the circuit diagram. Thus, a forward step of the stop barrel 211 is initiated by means of the worm gearing 212, 213. The rotation of the worm wheel 213 causes first the narrower switch pin 216 to fall into one of the cam grooves 217 so that the spring-loaded switch $H_p$ is closed. The energized relay $Sch_p$ has closed the contact $sch_{p1}$ so that the relay $Sch_p$ is grounded grounded through the switch $H_p$ and remains energized independently of the switch $U_p$.

As the rotation of the worm wheel 213 is continued, the broader switch pin 215 falls also into the cam groove 217 so that switch $U_p$ is changed over from contact position 1 to contact position 2 to energize the relay $R_p$. The break contact $r_{p2}$ is now open to interrupt the connection leading from the relay $Sch_p$ through the switch $U_p$ to the switch $K_{sch\,II}$. The energization of the relay $R_p$ causes also the closing of the contact $r_{p1}$ to enable a direct flow of current from E via $K_{sch\ III}1-r_{p1}-R_p$ to the battery so that the switch $U_p$ does not affect the further function. Hence, the function of the relay $R_p$ will not be affected when the continued rotation of the worm wheel 213 urges the switch pin 215 out of the cam groove 217 so that the switch $U_p$ is changed over to contact 1.

The drive motor WM will not be stopped until the switch pin 216 leaves the cam groove 217 to open switch $H_p$ and deenergize the relay $Sch_p$.

The stepping of the stop barrel 211 may be effected as a part of a sequence of operations or as an independent sequence of operations. If the stepping is only a part of a sequence of operations, all other movements of machine elements must be blocked until the stepping has been completed and a pulse must not be delivered to the central controller after the completion of these movements. This is achieved in that the contacts 1 and 4 of the switch $K_{sch\ III}$ of the central controller are held open so that no current can flow through the closed contact $r_{p3}$ of the relay $R_p$ to the relays $R_d$ and D, which would cause the delivery of a pulse.

On the other hand, if the stepping of the stop barrel 211 is an independent sequence of operations, a pulse must be delivered to the central controller to step it when the stepping of the barrel has been completed. This is effected in that the energization of the relay $R_p$ closes the contact $r_{p3}$ and the central controller closes the contacts 1 and 4 of the switch $K_{sch\ III}$. This completes a circuit from ground via contact $r_{p3}$, contacts $K_{sch\ III}1$, $K_{sch\ III}4$, break contact *dh*, relay $R_d$ to battery. The energized relay $R_d$ closes the contact $r_d$ to energize the relay D, which controls the means for rotating the central controller, so that the latter is caused to perform a step. By the stepping of the central controller, the contact $K_{sch\ III}1$ is opened so that the relay $R_p$ is deenergized and its contacts are restored. The control system is now ready for beginning another control cycle.

To enable a stepping of the stop barrel 211 when the automatic control is not yet effective, particularly during setting-up the machine, a push button switch $T_p$ is provided, which is grounded just as the contact $K_{sch\ III}1$ and when actuated initiates the same operations as the switch $K_{sch\ II}$.

A push button switch T for energizing the relay D serves for stepping the central controller independently of the automatic control.

*Blocking of the motions of the machine elements during the stepping of the stop barrels*

In order to enable the blocking of all motions of machine elements during the stepping of the stop barrel 211, the relay $Sch_p$ which controls the motor WM has a break contact $sch_{p2}$. During the movement of the stop barrel 211 the relay $Sch_p$ is energized so that the break contact $sch_{p2}$ is open during this time so that the contactors $Sch_I$ and $Sch_{II}$ connected to ground via this break contact are deenergized. By means of the contacts 2 or 3 of the switch $K_{sch\ III}$, depending on the desired direction of rotation of the feed motor, these contactors $Sch_I$ and $Sch_{II}$ can be energized only when the relay $Sch_p$ is deenergized and the break contact $sch_{p2}$ is closed. This will only be the case when the stop barrel 211 is standing still. In a similar manner, the relays controlling any other movements of machine elements can be kept deenergized during the stepping of the stop barrels.

*Automatic change-over from high-speed motion to feed motion*

To increase the dimensional accuracy of the workpieces, all moving machine elements engage the stops on the stop barrels at the same velocity in order to actuate the pulse generator. The basic velocity for this engagement may be, e.g., the feed velocity. For idle movements through substantial distances, e.g., for returning the slide rest of the lathe, or the table of a milling machine, however, it is desirable to provide for a high-speed idling motion at a velocity which is a multiple of the feed velocity. To avoid an engagement of the machine element with the stops at this high speed, an automatic change-over from the high-speed motion to the feed motion is provided for according to the invention.

The switch $K_{sch\ I}$ of the central controller connects in contact position 1 the relay $V_{sch}$ controlling the feed motion to the battery whereas in contact position 2 the relay $E_{sch}$ controlling the high-speed motion is connected to the battery. The connection to ground is effected through the break contact $sch_{p2}$ so that the relays $V_{sch}$ and $E_{sch}$ will remain deenergized during the stepping of the stop barrel 211, as has been described hereinbefore. The switch $E_u$ being in the non-actuated contact position 2 connects the relay $E_{sch}$ to ground via the contact $K_{sch\ I}2$ and the break contact $sch_{p2}$. The switch $E_u$ carries a switching pin 123, which is arranged according to FIG. 4 in the step 120 carried by one of the machine elements. Before the stop 120 engages the stop screw 122 of the stop assembly carried by the stop barrel, the switch pin 123 is displaced by an appropriate cam 121 carried by the clamping plate 220 so that the switch $E_u$ is moved into contact position 1. Thus, the high-speed motion is discontinued at an appropriate time and at the same time the feed motion is initiated by means of the relay $V_{sch}$ so that the stop 120 will engage the stop screw 122 of the stop barrel 211 only at the feed velocity. The relays $V_{sch}$, $E_{sch}$ may be parts of electromagnetic clutches.

*Switching the machine to different control stages*

In the circuit diagram shown in FIG. 6, different ground connections E with designations I and II are shown to indicate that the ground connections are not always made at the same terminals whereas the electrical potential with respect to ground is always the same. This provision of separate ground connections enables a switching of the machine to different control stages as is diagrammatically indicated in FIG. 7. For instance, in the case of a center lathe, the machine is deenergized in control stage 0. In control stage I, the three phases R, S, T of the three-phase A.C. supply are connected and the machine can be used as a normal center lathe. In control stage II, the pulse generators and associated signal lamps as well as the various push button switches are all connected to ground at EI whereas all connections to the automatic control system are interrupted. This enables a very simple and accurate adjustment of the stops. The easy and rapid adjustment of the automatic control system is one of the most important advantages of the present arrangement. When the sequence of operations has been completely preset, the arrangement is switched to control stage III, in which the automatic control system is operative.

The present invention is an improvement of the known control system described hereinbefore with reference to FIGS. 1 to 7.

The invention will now be described with reference to a lathe, in which each direction of movement of a slide rest has associated therewith a stop, which limits the movement of the slide rest and which must be automatically rotated. This rotation of the stop may be initiated during setting-up by auxiliary switches ($I_p$, $I_1$, $II_p$, $II_1$ etc., FIG. 29).

A main switch H (FIG. 23) has three positions. In the intermediate position, all motors of the lathe are deenergized. In the top position, all motors are energized whereas the lower position of the switch causes the recording of the respective operation. The use of the main switch H for recording avoids in a simple manner a wrong operation of the automatic lathe during the recording of the operation.

The lathe shown in FIGS. 8 to 14 has a hydraulic duplicating device 28, duplicating templates 29 of which are carried by a duplicating template carrier 56. An associated sensing lever is indicated at 58. The lathe comprises a slide rest I, which carries a multi-path and/or multi-position lever $I_1$, two differential verniers 5 for the longitudinal and transverse movements, respectively, a cross slide 27 with the duplicating device 28, a tool post 57 and a main switch H. 66 is a headstock spindle, 67 a lead screw and, if desired, feed shaft, 68 a drive mechanism for feed, high-speed and low-speed movement, 69 a rigid clutch, e.g., an electromagnetic toothed clutch, 70 a clutch for the lead screw and, if desired, feed shaft, and KL a clutch for the transverse movement. 78 are change gears, 79 and 91 are flanges of the duplicating template carrier 56. The lathe has adjustable stops 25 on rotatable stop barrels 26 for the longitudinal and transverse movements.

A tailstock 105 carries in a tailstock sleeve 106 a live center 114.

A setting-up control desk 6 (FIG. 12) is provided with a selector switch W, setting-up switches $I_p$ and $I_1$ for the transverse stop and longitudinal stop and $I_k$ for duplicating templates, further with a general on-off switch and a selector switch for speed and feed rate, a pulse switch and corresponding pilot lamps. The setting-up desk 6 is adjustable along the machine for easy of access from any operating station.

The lathe carries also a barrel-type switch 7 for setting the number and direction of the duplicating cycles. This switch will be explained more fully with reference to FIGS. 31 and 32.

I. THE SETTING UP OF A LATHE

(a) Mechanical functions for setting up to dimension

The most important accessory for setting up to dimensions is the differential vernier 5 shown in FIGS. 17–23. In the fully automatic lathe, this vernier is operated by the respective slide rest screw when the associated switch lever ($I_1$, $II_1$ etc., FIGS. 1 to 12 and 21) has been operated.

The differential vernier 5 comprises two vernier scale rings 10 and 11 (FIGS. 17 and 18) which can be rotatably adjusted by hand in the left- or right-hand sense to the desired dimension. The vernier scale ring 10 shows the units and tens and the parts of units, which may be very small depending on the circumference. This vernier scale ring is driven as is usual in lathes by means of friction pressure members 12 (FIG. 17) which are accommodated in the cover plate 13, and by the differential drive housing 14 and 15, which is firmly keyed to the screw end portion 16. This direct connection ensures an exact reading of the dimension and an exact switching off at the desired dimension. The vernier scale ring 11 carries a scale of units and tens as subdivisions, and of hundreds. Owing to its high scale values this ring is not very sensitive with respect to reading and switching accuracy so that it can well be driven by the differential drive.

The differential drive comprises the differential drive housing 14 and 15 (FIG. 17), which is rigidly connected to the screw end and in which the differential gears 17 and 18 are rotatably mounted. These gears are in mesh with the internal teeth of the stationary body 19. The ratio of the number of teeth of the body 19 to that of the vernier scale ring 11 being 99:100, the numbers of revolutions of the vernier scale rings will have a ratio of 1:100. This vernier arrangement results in a substantial increase of the range of measurement and switching in spite of the setting to one hundredth of a millimeter.

To enable the adjustment of the vernier scale ring 11, the differential gears 17 and 18 must be provided with a clutch, which disengages during manual adjustment but rigidly connects the gears 17 and 18 during mechanical operation. For this reason, the gears 17 and 18 carry Hirth-type face serrations 20. The number of serrations is directly related to the number of divisions of the vernier scale rings. This results in an adjustment in accordance with the scale divisions. The elastic pressure $f$ required to engage the Hirth-type serrations is produced by the spring 21. To enable a manual operation of the slide rest screw in the case of a breakdown, a bore 22 is provided which is adapted to receive a handle.

Because the vernier is intended for a movement in the left-hand and right-hand senses, as has been mentioned above, it carries a double scale, which permits of a reading and switching after a movement to the right and left from 0.

Three contact projections 23, 23$l$ and 23$r$ are attached to the vernier scale ring 10. The contact projection 23 serves for contact operation during single piece work. Contact projections 23$l$ and 23$r$ serve to effect the left-hand and right-hand movements, respectively, of the slide rest when setting up the lathe for automatic operation. The contact projection 23 will switch exactly when the adjusted dimension has been reached whereas the contact projections 23$r$ and 23$l$ switch off one millimeter before so that in position 0 only the contact projection 23 will be in registry with the contact pin 24 whereas contact projections 23$r$ and 23$l$ have been rotated one millimeter beyond the associated contact pin 24$r$ or 24$l$, respectively.

This overrunning is due to the contact stroke of the stop barrel 26 (FIG. 23). The stop 25 of the stop barrel 26 will contact the slide rest 1 mm. before the desired dimension has been reached and the slide rest will axially displace the stop barrel by 1 mm. during automatic operation to the positive end position of the stop, in which the pulse causing the advance of the central controller is delivered. This arrangement enables the desired workpiece dimension of the automatic sequence of operations to be achieved in the first workpiece obtained during setting up.

Particularly at higher feed rates, the vernier scale rings might easily overrun the contact pins 24$l$ or 24$r$. To avoid this, the contact projection 23/100 does not have a sharp edge (see FIG. 22), but is flattened so that the full contact stroke is obtained before the position 0 is reached. As is apparent from the circuit diagram of FIG. 66, the contact pin 24/100 (FIG. 21) does not only operate the contact 24 ($l$ or $r$)/100 but also its contact 24$l$ ($l$ or $r$). Owing to the flat of the contact projection 23, this low-speed contact will energize the auxiliary pulse relay $HR^1$ before the position 0 has been reached. This causes the contact $hr_2^1$ of this relay to close to cause the low-speed clutch relay $LgKR$ to pick up. The relay $LgKR$, however, does not only start the low-speed movement but its contacts $lgkr_1$ and $lgkr_2$ stop by means of the relay $VKR$ or $EKR$ in series therewith the feed movement or high-speed movement which is being performed.

(b) Electrical functions for setting up to dimension

Figure 35:
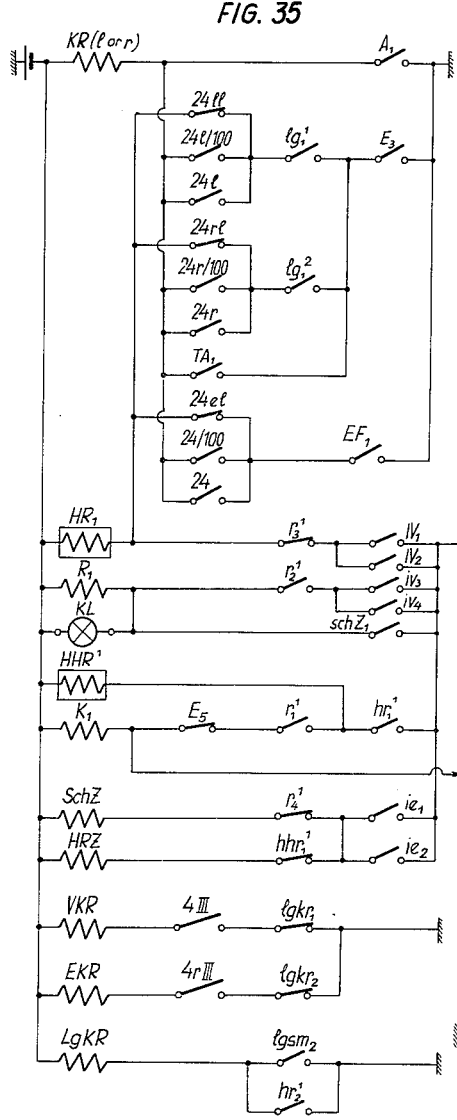
FIG. 35 is a circuit diagram of the electrical parts of the differential vernier.

The current flow in the various phases is apparent from the circuit diagram of FIG. 35.

The contact $E_3$ is arranged at the service selector switch W (FIGS. 12 and 29) and is closed during setting up, when the selector switch is in position "Setting Up."

The contacts $lg_1^1$ and $lg_1^2$ are contacts of the switch lever $I_1$. $lg_1^1$ is closed only during a movement of the slide rests 27 (FIGS. 8, 9, 10, 14, and 23) to the left and $lg_1^2$ only during a movement to the right. Finally, the contacts 24$l$, 24$r$ and 24$l$/100; 24$r$/100 belongs to the contact pins 24$l$, 24$r$ and 24/100 (FIGS. 17 to 22). These contacts are open when the vernier scale rings 10 and 11 are in position 0, e.g., 1 mm. before position 0. When the vernier scale rings are rotated to any desired dimension, the contacts 24$l$ and 24$l$/100 (24$r$ and 24$r$/100) or at least one contact 24$l$ (24$r$) will close if the adjusted dimension does not have a tens or hundreds digit. This causes a circuit to be completed from earth via $E_3lg_1^1$ (or $lg_1^2$), 24$l$ (or 24$r$) or 24$l$/100 (or 24$r$/100) and the switching relay $KRl$ ($KRp$) for the longitudinal (or transverse) clutch 70 or KL (FIG. 14) to battery. The relay $KR$ will pick up to energize the electromagnetic clutch 70 or KL for the longitudinal (or transverse) movement. The slide rest screw 16 (FIG. 17) starts rotating, the slide rest 27 moves and with it the differential vernier. This will be continued until in position 0 or, since the setting up is for automatic operation, 1 mm. before position 0, the hundreds ring 11 as well as the units-tens ring 10 open the contacts 24$l$ and 24$l$/100 (24$r$ and 24$r$/100) to deenergize the switching relay KR. This stops the rotation of the slide rest screw 16 and of the differential vernier and arrests the feed movement of the slide rest 27. The stop 25 (FIGS. 8, 10, 14, and 23) on the stop barrels (26) is now set to engage the tool support or workpiece support (slide rest or apron) 27 and is fixed in position by a screw. To obtain the correct dimension, the slide rest must be moved further by a predetermined amount, e.g., one millimeter, if desired. This causes the stop barrel 26 to be moved also one millimeter to the pulse delivery position, i.e., the positive end position of the stop.

This movement is also automatically performed by operation of the release key $TA_1$ ($l$=longitudinal, $p$=transverse). This key virtually shunts the opened contacts 24 to cause the movement of the slide rest 27 to be continued. To avoid an enforced excessive movement of the stop, the torque of the electromagentic clutch is reduced by connecting a resistor W$i$ ($p$ or $l$) in series therewith. This is effected by the opening of the second spring set $TA_2$ of the release key (circuit diagram of FIG. 36). When the stop barrel has reached its positive end position, a signal lamp is energized to indicate the completion of the setting-up to dimension.

(c) *Electrical functions for automatically recording the sequence of operations*

The operation is recorded by the central controller before the release key TA is operated. The operation of the switch lever $I_1$ or $II_1$ etc. (FIGS. 8–11, 14 and 23) closes also the contact $lg8^{(1+2)}$ or $pl8^{(1+2)}$ (circuit diagram of FIG. 37, $lg$=longitudinal movement, $pl$=transverse movement, (1+2) indicates that the contacts are closed during a movement to the left and right), which is connected in series with a contact $2^{II}$ or $2a^{II}$, which belongs to a central controller and is operated by the respective switch cam 2 (FIGS. 15 and 16) associated with the function concerned. Contact $E_1$ of the service selector switch W is closed in position "Setting Up." To energize the relay RII (circuit diagram of FIG. 37 and FIG. 24) for energizing the clutch magnet MII, it is now sufficient to cloes the contact $hh_1$ of the main switch H. A circuit is thus completed from earth via $$E_1-hh_1-fr_1-lg8^{(1+2)}-2^{II}-pl8^{(1+2)}-2a^{II}-RII$$

to battery. By a mechanism which will be described hereinafter, the switch pin 1 (FIGS. 15 and 16) will be intermittently rotated through steps of 90° until it operates the selected spring set which contains the contact $2^{II}$ ($2a^{II}$). This will start the desired operation (e.g., transverse or longitudinal movement) but the associated auxiliary setting-up contact (in this case) $2^{II}$ is opened to deenergize the relay $R^{II}$ and stop the intermittent rotation of the switch pin 1.

(d) *Mechanical functions for automatically recording the sequence of operations*

To set up a desired operation in the central controller, the switch pin 1 (FIG. 16) must be rotated to cause the switch cam 2 to operate the spring set 3 or 4 which starts the desired function. Mechanical operations analogous to the electrical operations described in section (c) will be performed as is apparent from FIGS. 24 and 25. The driver pin 30 slidably mounted in the Maltese cross 33 carries at its lower end the driver 31, which is urged upwardly by the spring 32. The clutch magnet MII is disposed above this arrangement, the underlined portions being emphasized by underlining.

When the clutch magnet MII is now energized, as described in section (c), the armature 34 of the magnet will be depressed so that the driver pin 30 with the driver 31 is pushed onto and connected to the switch pin 1. During the downward movement, the switch pin 1 is displaced until its locking pin 41 (FIG. 15) has left the notch 40 to enable a rotation of the switch pin 1 (FIG. 15). The downward movement of the armature 34 causes the disc 35 to operate the spring set 36 and to close the contact $m_1{}^{II}$ (FIG. 24 and circuit diagram of FIG. 38). This causes the contactor $Sch14$ to pick up and energize the motor for driving the worm 37. This worm 37 moves the worm wheel 38 and the Maltese cross driving disc 39 rigidly connected to said worm wheel. By each full revolution, this disc 39 causes a 90° step of the Maltese cross 33. As a result, the driver pin 30 and by the driver 30 the switch pin 1 with the switch cam 2 are intermittently advanced in steps amounting exactly to one fourth of a revolution until the desired position has been reached, in which the spring set 3 (or 4) is operated to open the contact $2^{II}$ (circuit diagram of FIG. 37, FIGS. 15, 16). This contact $2^{II}$ deenergizes the relay RII, which controls the clutch magnet MII. The armature 34 rises to its position of rest. The driver pin 30 and the driver 31 are also urged upwardly by the spring 32 whereby the driver 31 is removed and disengaged from the switch pin 1. The rise of the armature causes the disc 35 to disengage the spring set 36. The contact $m_1{}^{II}$ is opened, the contactor $Sch14$ is deenergized and the motor driving the worm 37 is stopped (circuit diagram of FIG. 38 and FIG. 24).

(e) *The automatic rotation of the central controller after the automatic setting*

The energization of the contactor $Sch14$ (circuit diagram, FIG. 38) renders the central controller ready for rotation.

The picking up of the contactor $Sch14$ closes the contact $sch14$ thereof (circuit diagram of FIG. 38) and energizes a response of the automatic control auxiliary relay AHR in a circuit from earth via $fr_2-vr_4-E_2-hh_2-sch14_4$–AHR to battery (circuit diagram of FIG. 38).

Figure 39:
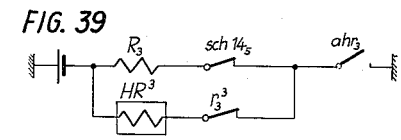
FIG. 39 is a circuit diagram of the electrical components by which the rotation is effected.

Contacts $E_2$ and $A_3$ of the selector switch are closed in position "Setting Up." The contact $hh_2$ of the main switch H has been closed together with the contact $hh_1$. Together with the closing of contact $sch_{14}$, $sch14_4$ the contact $sch14_5$ (circuit diagram of FIG. 39) is opened so that the contact $ahr_3$ closed by the picking up of relay AHR energizes the auxiliary relay $HR^3$ in a circuit from earth via $ahr_3-r_3{}^3-HR^3$ to battery so that $HR^3$ picks up. Only when the switch pin 1 (FIGS. 15, 16) of the central controller has been moved and the contactor $Sch14$ has dropped out, will the contact $sch14_5$ close and the relay $R^3$ pick up.

Figure 41:
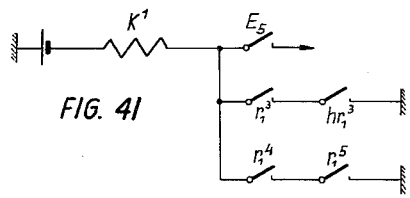
FIGS. 41 and 42 show circuit details for the step-wise advance of the central controller.

Contact $r_3{}^3$ will open to deenergize the auxiliary relay $HR^3$. Contact $ahr_3$ remains closed because the relay AHR is energized through the holding contact $ahr_1$ when contact $sch14_4$ is opened. Since the relay $HR^3$ drops out with a time delay and the contact $r_1{}^3$ (circuit diagram of FIG. 41) is already closed, a current path is established for the time by which the drop-out of the auxiliary relay $HR^3$ is delayed. This time is sufficient to advance the stepping relay $K^1$ (circuit diagram of FIG. 41) by one step. As a result, contact $k_1{}^1$ (circuit diagram of FIG. 42) is closed, contact $k_2{}^1$ is opened and contactor $Sch15$ is energized in a circuit from earth via $kmd_1-k_1{}^1-m_2{}^1-Sch15$ to battery. Contactor $Sch15$ energizes the drive motor for advancing the central controller. This motor starts and advances the controller to the next position, whereby contact $kmd_1$ (circuit diagram of FIG. 42) is opened, contactor $Sch15$ is deenergized and the central controller stops.

If the contacts $hh_1$ and $hh_2$ of the main switch H were not opened immediately, the automatic recording cycle would be resumed and result in wrong settings because the advancing of the central controller would also cause the energization of the relay VR by the contact $sch15_5$ (circuit diagram of FIG. 42) to open the contact $vr_4$ (circuit diagram of FIG. 38), whereby the relay AHR would be energized and at its contact $ahr_3$ (circuit diagram of FIG. 39) would deenergize the relay $R^3$ so that the initial condition of the electrical parts for the automatic recording would be reestablished.

To avoid a wrong switching, an interception circuit is provided according to the invention to block until the main switch H is re-set. The operation of relays $R^3$ and $HR^3$ enables a current path to be established for a short time, as has been described hereinbefore. The contacts $r_2^3$ and $hr_2^3$ form a current path, which produces a pulse causing the intercepting relay FR (circuit diagram of FIG. 37) to pick up. The intercepting relay FR will then hold itself at its holding contact $fr_1$ in a circuit from earth via $E_1$–$hh_1$–$fr_1$–FR to battery until the main switch H has been re-set to open the contacts $hh_1$ or $hh_2$ (circuit diagrams of FIGS. 37 and 38). The opening of the contact $fr_2$ caused by the picking up of relay FR prevents the energization of the contactor $Sch14$ so that the motor for driving the worm 37 is deenergized and cannot drive the recording mechanism. This blocking circuit is maintained until the main lever H has been re-set and the contacts $hh_1$ or $hh_2$ have been opened. The operation of the change-over contact $fr_1$ energizes the signal lamp AL to indicate that the "recording of the operation by the central controller" has been completed, whereafter the main switch H can be re-set and all devices are ready for the next recording.

(f) *The automatic erasing or re-setting of the central controller to position 0*

When a job has been completed and the next job is to be set up, the central controller must first erase all recordings and all switch pins must to moved to a position 0.

This "Erasing" is also fully automatically effected by moving the main switch H to position "Off" and the selector switch to position "Erasing." In position "Erasing" the contact $R_1^{II}$ (circuit diagram of FIG. 37) and the contact $R_2$ (circuit diagram of FIG. 38) of the service selector switch W are closed. Likewise, contact $A_3$ (circuit diagram of FIG. 38) remains closed as it is open only during automatic operation.

When the central controller has been set, the contacts $1^I$ or $1a^I$; $1^{II}$ or $1a^{II}$ etc. are closed. When the contact $R_1^{II}$ is closed (circuit diagram of FIG. 37), a current flows in a circuit from earth via $R_1^{II}$–$1^{II}$ (or $1a^{II}$) etc. $R^{II}$ (or RI etc.) to battery. The switching relay RII (or RI etc.) picks up to energize the clutch magnets MII (MI etc.). In analogy to the setting-up operation, the mechanism of FIG. 24 is operated, but in this case the deenergized contact $2^{II}$ (or $2a^{II}$; or $2^I$ or $2a^I$ etc.) of the central controller is closed and the contacts $1^{II}$ (or $1a^{II}$; or $1^I$ or $1a^I$), which are closed when the central controller is set, or opened. When all contacts $1^{II}$ or $1a^{II}$ ($1^I$ or $1a^{II}$ etc.) are open, all clutch magnets are deenergized and their contacts $m_1^I$ ($m_1^{II}$; $m_1^{III}$ etc.) (circuit diagram of FIG. 38) are open. Contactor $Sch14$ is deenergized so that the operation of the mechanism of FIG. 24 is terminated.

Just as during the setting-up, the central controller is now advanced by one step. Then the re-setting can high again. This is continued until all lines of the controller and each switch pin 1 (FIGS. 15 and 16) in each line have been moved to position 0, in which it cannot control an operation.

Figure 37:
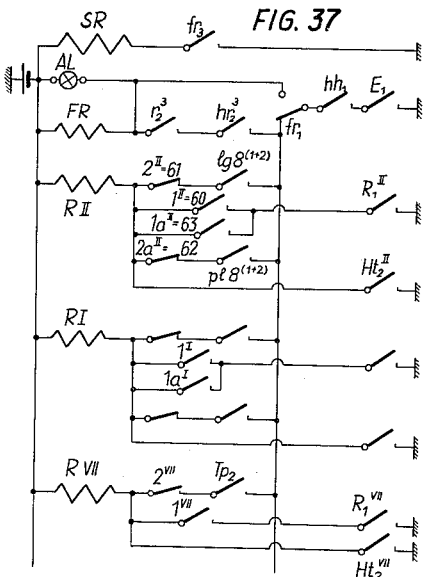
FIG. 37 is a circuit diagram associated with FIGS. 15 and 16 and illustrating means for automatically recording and erasing a sequence of operations.
Figure 38:
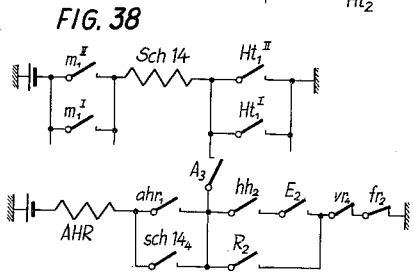
FIG. 38 shows the electrical parts of the intermittent mechanism shown in FIGS. 24, 25 and for making the central controller ready for rotation.

As is apparent from the circuit diagram of FIGS. 37 and 38, the intercepting circuit (relay FR with contacts $fr_1$; $fr_2$) is not operated during erasing.

The pulse circuit is deenergized at a contact $vr_4$, which is opened during the advance of the central controller. The relay VR (circuit diagram of FIG. 42) is energized by a contact $sch15_5$ of the contactor $Sch15$, which controls the motor for the stepwise rotation of the central controller.

(g) *The shifting of individual switch pins*

To enable a rotation of any desired switch pin 1 (FIGS. 15 and 16) without changing the overall setting in the case of errors or to make subsequent changes in the setting of the central controller, a manual key with contacts $Ht_2^I$; $Ht_2^{II}$ etc. or $Ht_1^I$; $Ht_1^{II}$ (circuit diagram of FIGS. 37 and 38) is provided for each switch pin. The operation of a manual key closes a contact $Ht_2^I$ or $Ht_2^{II}$ etc. (circuit diagram of FIG. 37) to complete a circuit from ground via $Ht_2^{II}$–RII to battery so that the switching relay RII (or RI etc.) responds to energize the associated clutch magnet MII (MI). Just as during the automatic setting of the central controller, this causes the associated contact $m_1^I$ or $m_1^{II}$ etc. (circuit diagram of FIG. 38 and FIG. 24) of the clutch magnet to be closed. As the operation of the manual key closes also the respective second contact $Ht_1^{II}$ (or $Ht_1^I$) of the manual key, a circuit is completed from earth via $Ht_1^{II}$–$Sch14$–$m_1^{II}$ to battery to energize the contactor Sch 14.

The contactor $Sch14$ energizes the motor for driving the worm 37 (FIG. 24) to cause an intermittent rotation of the switch pin 1 (FIGS. 15 and 16) as long as the manual key is operated (see specification, section (d), "Mechanical Functions for Automatically Recording the Sequence of Operations").

The individual changing operations can only be performed with the selector switch in position "Automatic" or "Single Piece Work" because in this position the selector switch contact $A_3$ is opened to prevent an automatic setting so that the change is restricted to the respective switch pin.

(h) *Constant stop-engaging pressure*

To achieve a certain dimensional accuracy of the workpieces which are manufactured, the engaging pressure at the stops must be as uniform as possible and the speed of the slide rest or tool support when engaging the stop must be uniform.

The fulfilment of these requirements may be ensured by connecting a resistor in series with the electromagnetic clutch to reduce the torque when the stop barrel reaches the beginning of its contact path and by delaying the delivery of the pulse to the central controller by an adjustable time-limit relay. During this time delay the electromagnetic clutch will slip to produce a constant, reduced torque owing to the series resistor. This constant and reduced torque is a basic requirement for a predetermined and uniform stop-engaging pressure.

Figure 36:
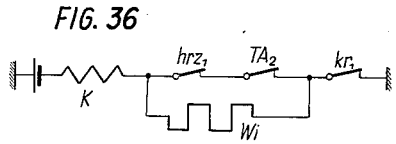
FIG. 36 illustrates switching means for obtaining a constant stop-engaging pressure at a reduced torque.
Figure 40:
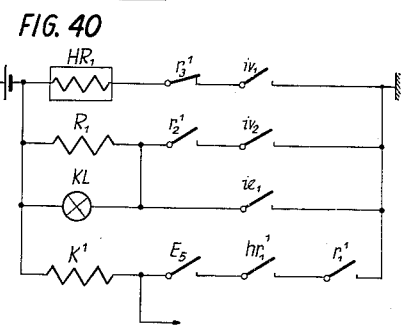
FIG. 40 is a circuit diagram illustrating the pulse generation and the achieving of a constant stop-engaging pressure.

The electric switching operations are apparent from the circuit diagrams of FIGS. 35, 36 and 40. They reside essentially in the delivery of a pulse, which has been described in connection with the "Automatic Recording of the Sequence of Operations" in section (c). This pulse delivery is substantially extended in the present case.

The simple pulse delivery is shown once more in the circuit diagram of FIG. 40. To cause the delivery of a pulse, the slide rest (workpiece carrier or tool carrier) displaces the stops by a predetermined amount, e.g., 1 mm. At the beginning of this stroke, the pulse preparing contacts $iv_1$ and $iv_2$ are closed. The closed circuit from earth via $iv_1$–$r_3^1$–relay $HR^1$ to battery energizes the auxiliary pulse relay $HR^1$ to close its contact $hr_1^1$. The pulse-releasing contact $ie_1$ is closed at the end of this pulse-generating stroke to complete a circuit from earth via $ie_1$–$R^1$ to battery. This energizes relay $R^1$ to close the holding contact $r_2^1$ and the contact $r_1^1$ at the same time and to open the contact $r_3^1$, whereby the relay $HR^1$ is deenergized to drop out with a time delay. This causes a circuit from earth via $r_1^1$–$hr_1^1$–$E_5$–$K^1$ to battery to be temporarily closed. The stepping relay $K^1$ picks up to close a contact $k_1^1$ and to open $k_2^1$ (circuit diagram of FIG. 42), which causes the contactor Sch15 to be energized and start the motor for the intermittent rotation of the switching barrel of the central controller. When the switching barrel has been advanced one step, it operates the contacts $kmd_1$ and $kmd_2$ to open $kmd_1$ and close $kmd_2$ so that the contactor Sch15 is deenergized and the motor stops. Thus, the control cylinder or switching barrel has been moved to a new control position.

If an immediate delivery of the pulse is not desired, a timer Schz is to be connected in series.

The circuit is apparent from the circuit diagram of FIG. 35. At the beginning of the switching stroke of the stop-barrel, 1 mm. before the positive stop, the pulse-initiating contacts $iv_1$ and $iv_2$ (or $iv_3$ and $iv_4$) are closed, (e.g., $iv_1$ and $iv_2$ during a movement to the left and $iv_3$ and $iv_4$ during a movement to the right) to cause the auxiliary pulse relay $HR^1$ to pick up, whereby its contact $hr_1^1$ is closed to energize the auxiliary relay $HHR^1$, which at its contact $hhr_1^1$ prepares the auxiliary timer relay HRZ for energization.

Figure 43:
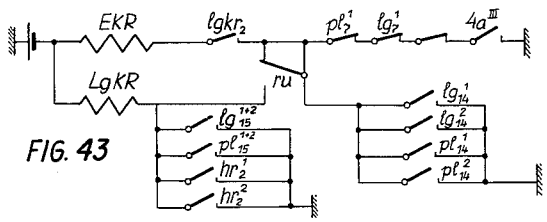
FIGS. 43 and 44 show the electrical components for interrupting the feed and high-speed movement and for starting a low-speed movement.

When the auxiliary pulse relay $HR^1$ picks up, it starts the constant low-speed movement at contact $hr_2^1$ ($hr_2^2$ etc.) (circuit diagram of FIG. 43). This contact grounds the switching relay LgKR for the low-speed clutch. The picking-up of the relay LgKR does not only energize the low-speed clutch, but deenergizes any other switching relay that had been energized, e.g., for the feed movement or high-speed movement (in the circuit diagram of FIG. 43, the contact $lgkr_2$ of relay LgKR stops, e.g., the high-speed movement at the relay EKR). As a result, only the low-speed movement will be in progress when the auxiliary pulse relay $HR^1$ has picked up. For this reason, the stop is approached at a constant, low speed. The engagement of the slide rest or workpiece carrier with the stop 25 on the stop barrel 26 (FIG. 23) causes the latter to be urged against the positive stop (end of switching stroke) so that the pulse-releasing contact $ie_1$ (or $ie_2$) is closed, to complete a circuit from earth via $ie_1$–$r_4^1$–timer relay Schz to battery (circuit diagram FIG. 35). The timer relay Schz responds and after the set period closes its contact $schz_1$, which re-energizes the pulse relay R1. A pulse is delivered through the contact $r_1^1$ and the closed contact $hr_1^1$ to the stepping relay $K^1$, whereby the central controller is advanced. The contact $r_3^1$ deenergizes the auxiliary pulse relay, which drops out with a time delay to determine the duration of the pulse delivered to the stepping relay $K^1$. When the pulse-releasing contact $ie_1$ is closed, the auxiliary timer relay HRZ is energized through the closed contact $hhr_1^1$ and is operated. Its contact $hrz_1$ (circuit diagram of FIG. 36) connects the resistor Wi in series with the clutch magnet so that the torque of the electromagnetic clutch is reduced while the timer Schz is effective.

The drop-out of the auxiliary pulse relay $HR^1$ and the opening of the contact $hr_1^1$ deenergizes also the auxiliary relay $HHR^1$, which deenergizes at its contact $hhr_1^1$ the auxiliary timer relay HRZ. Since the relays $HR^1$ and $HHR^1$ drop out with a time delay, there is sufficient time for the advance of the central controller before the contact $hrz_1$ (circuit diagram of FIG. 36) opens and the clutch can be fully energized without series resistor.

The timer relay Schz is deenergized by the opening of contact $r_4^1$ and the pulse relay R1 holds itself at its holding contact $r_2^1$ and pulse-preparing contact $iv_2$ until an opposite movement has been initiated and performed for a predetermined distance, e.g., 1 mm. Movements of the slide rest or workpiece carrier causing the delivery of a pulse may be performed in other directions, e.g., as transverse or angular movements, because the picked-up pulse relay $R^1$ causes the pulse generator associated with the longitudinal movement to remain deenergized. Variations of the contact pressure of pulse contact $ie$ will have no effect. The signal lamp KL will shine when the relay $R^1$ is energized to indicate that the slide rest or workpiece carrier engages the positive stop.

To obtain a constant stop-engaging pressure, another electromechanical device is required to effect the change-over to the low-speed movement in time.

Again with reference to FIG. 4, the distance moved by the stop 120 from the time when the switch pin 123 engages the cam 121 to the time when the stop 120 engages the stop screw 122 may be referred to as the change-over stroke, this stroke may be performed within highly different times, depending on the rate of the feed or high-speed movement. For instance, 1.2 seconds or 1200 milliseconds are required at a feed rate of 50 mm./min., whereas only 0.03 second or 30 milliseconds are required for a movement of 1 mm. of the slide rest when performed as a high-speed movement at 2000 mm./min.

Assuming that the time for changing from the high-speed movement to the low-speed movement of the slide rest is 300 milliseconds, the cam 121 (FIG. 4) would require a length of at least 10 mm. to ensure that the slide rest stop 120 engages the stop screw 122 at low speed. With this length of the cam 121, the change at a feed rate of 50 mm./min. will be effected after 0.25 mm., whereas the remaining 9.75 mm. would take about 19.25 seconds at low speed compared to about 12 seconds at the feed rate. This will result in an intolerable loss of time.

For this reason, the change times or change distances must be varied in dependence on the speed of the movement.

A change of the change distance would mean a variation of the cam 121, which would make the setting-up work much less reliable and much more time-consuming. The circuit diagram of FIG. 44 illustrates the switching operations involved in the change to the low-speed movement in consideration of the requirement that the starting of an opposite or different movement must render ineffective the change effected at the termination of the previous movement so that the following movement will begin immediately at full speed although the contact pin 123 is still in engagement with the cam 121.

RU is the change-over relay, which is energized through contacts ($schr_1^1$ etc.) of the time-limit relays $Schr^1$ or $Schr^2$ (FIG. 48) and contacts (UEL$l$ etc.) of the contact pin 123 and, during automatic operation, controller contacts $5^{II}$ or $5a^{II}$ or, during manual operation, contacts $lg^{1+2}$ and $pl^{1+2}$.

Figure 44:
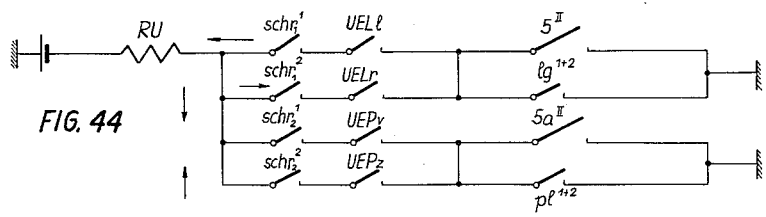

When it is desired, e.g., to move the slide rest from right to left, the relay $Schr^1$ (circuit diagram of FIG. 48) is energized to close the contact $schr_1^1$ (circuit diagram of FIG. 44). The contact $5^{II}$ of the central controller is closed because a longitudinal movement is to be performed. Contact UEL$l$ is that contact of the contact pin 123 (FIG. 4) which is on the left of the slide rest and runs up on the contact element 121 to close contact UEL$l$ during a movement of the slide rest to the left. This completes a circuit to energize the relay RU, which operates its contact $ru$ (FIG. 43) to change from the high-speed movement to the low-speed movement.

A change in the direction of movement causes the contact $schr_1^1$ to be opened and the contact $schr_1^2$ to be closed so that the relay is deenergized. The relay will also be deenergized if instead of a longitudinal movement caused by the operation of the contact $5^{II}$ of the central controller, the contact $5a^{II}$ is closed to initiate the transverse movement.

Figure 45:
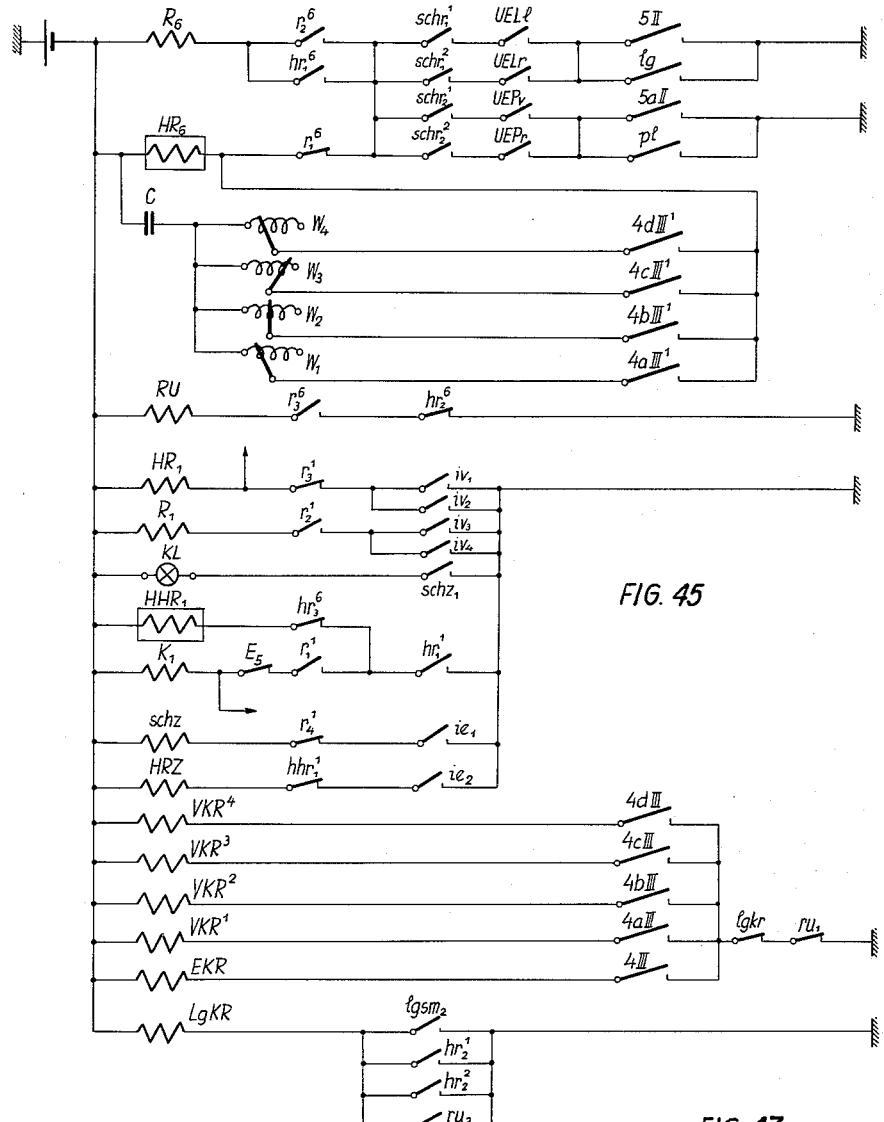
FIG. 45 is a circuit diagram showing an extended version of FIG. 44 and including a time-limit relay with a resistance-capacitance (RC) network.

The circuit diagram of FIG. 45 represents an amplified version of the circuit diagram of FIG. 44.

Figure 46:
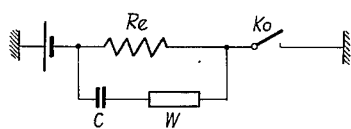
FIG. 46 illustrates a circuit with delayed drop-out.
Figure 47:
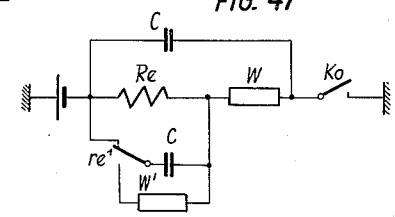
FIG. 47 illustrates a circuit with delayed pick-up.

This version includes a time-limit relay with a resistance-capacitance (RC) network (circuit diagrams of FIGS. 46 and 47).

This discharge circuit may include resistors having different resistance values to vary the time delay of the drop-out of the relay.

This effect has been utilized to vary the change times in dependence on the feed rates without troubling the operator.

The circuit diagram of FIG. 45 is based on the assumption that four different feed rates can be selected by the automatic control system. In accordance therewith, four feed clutch relays $VKR^{1-4}$ are provided, which can be energized by contacts $4a^{III}$ to $4d^{III}$ of the central controller. The closing of one of these contacts will cause the closing of the associated contacts $4a^{IIII}$ to $4d^{IIII}$ of the central controller and the connection of one of the resistors $W_1$ to $W_4$ into the discharge circuit—capacitor C and resistors 1 to 4—of the relay $HR^6$.

Depending on the type of the feed drive mechanism—transmission with fixed transmission ratios or for continuous variation—the resistors $W_1$ to $W_4$ have fixed or continuously variable resistance values.

If the feed drive mechanism has fixed transmission ratios, the resistors are matched once to the various feed rates. In the case of a continuous adjustment of the feed rate, the resistance values of the resistors $W_1$ to $W_4$ are continuously adjusted together with the feed rate by coupling the adjusting means.

In most continuously variable electric drives the speed control is effected by potentiometers. These may be directly connected, e.g., to the shaft of $W_1$ to $W_4$, which may be designed to have a circular configuration, similar to a potentiometer. The functions of contacts $schr_1{}^1$ etc., $UELl$ etc., $5^{II}$ and $5a^{II}$ have been described hereinbefore. As contrasted with the circuit diagram of FIG. 44, the current flow with operated contacts is here through the relay contact $r_1{}^6$ and relay $HR^6$, which responds to close its contact $hr_1{}^6$, whereby relay $R^6$ is energized and at its contact $r_1{}^6$ deenergizes the relay $HR^6$ and at its holding contact $r_2{}^6$ holds itself in circuit. The contact $hr_2{}^6$ in series with the changeover relay RU has been opened when the relay $HR^6$ picked up. Only thereafter was contact $r_3{}^6$ closed so that an energization of relay RU was prevented.

When the RC network comprising the resistor $W^1$ to $W^4$ and the capacitor C has been discharged through relay $HR^6$, the latter drops out to close its contact $hr_2{}^6$, whereby the relay RU is energized and at its contact $ru_1$ deenergizes the feed or high-speed clutch and at its contact $ru_2$ energizes the low-speed clutch. To avoid a premature weakening and a consequent premature slipping of the high-speed clutch, the energization of relay $HHR^1$ is interrupted at contact $hr_3{}^6$. As has been described hereinbefore, this relay connects by means of the auxiliary timer relay HRZ the resistor in series with the electromagnetic clutch (see also the circuit diagram of FIG. 36).

The delayed picking up of the relay RU has been diagrammatically explained in connection with an auxiliary relay having a delayed drop-out. Where a very long delay of the pick-up is required, e.g., in superfinish turning work performed at very slow feed rates, it is preferable to use a timer relay driven by a synchronous motor rather than an auxiliary relay having a delayed drop-out. Where this timer relay is used, a time-adjustable contact mechanism is started by a synchronous motor when the same is energized and the actual relay picks up only when the set time has expired. In this case too the time adjusting means may be coupled with the means for adjusting the resistors $W^1$ to $W^4$.

In freed mechanisms which are changeable by means of change gears, the means for adjusting the resistors or the means for adjusting the delay of the time-limit relays are preferably independent and calibrated in millimeters per minute. In this last case, however, the resistors controlling the delay or the means for adjusting the delay time of the time setting means for the timer relay must be separately adjusted by the operator.

The circuit diagram of FIG. 47 shows a resistance-capacitance network for a relay having a delayed pick-up. This arrangement is also useful and comprises a plurality of variable series resistors W.

(i) *The automatic setting of the auxiliary functions*

Figure 12:
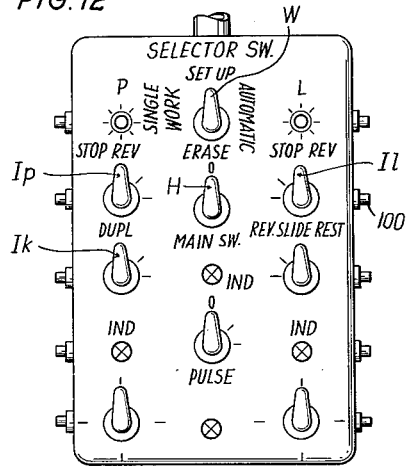
Figure 13:
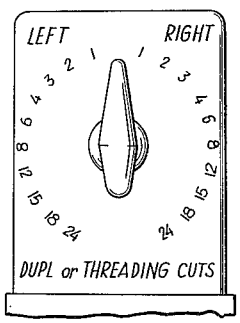
Figure 30:
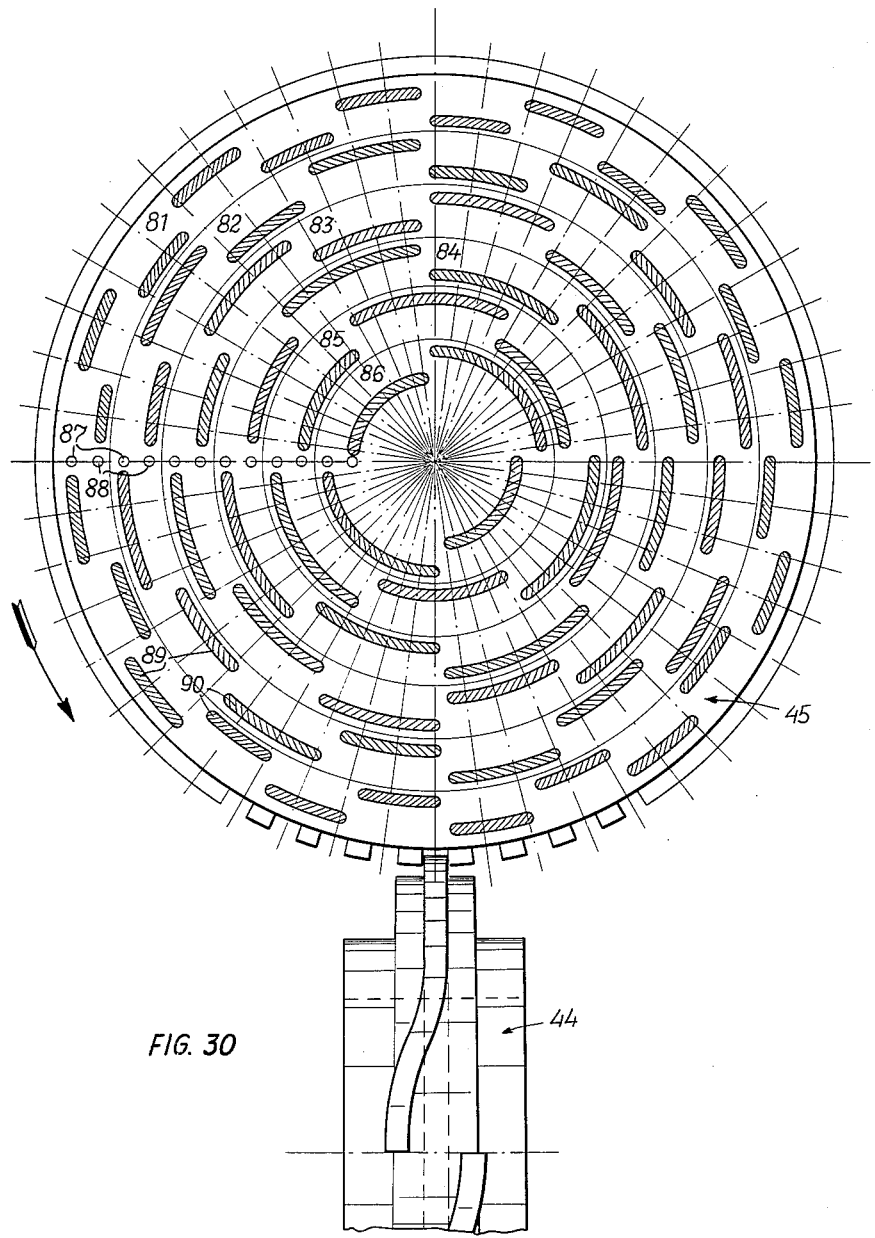
FIG. 30 shows a driving and switching disc for a duplicating template carrier.

As has been mentioned hereinbefore, each slide rest has at least two stop barrels associated with it (FIG. 23), as well as duplicating devices. The rotation of the stop barrels or duplicating templates is effected during setting-up by the auxiliary switches Ip, Il, Ik etc. (FIGS. 29, 30, 12). FIG. 32 shows an auxiliary switch arrangement for two slide rests and FIG. 29 shows an arrangement for two slide rest movements with duplicating device.

During setting up, the stop or/and the duplicating device are rotated at the beginning of the operation concerned. As this rotation is a part of the operation which is to be subsequently performed under automatic control, these operations must also be automatically recorded by the central controller. In order to eliminate mental effort and errors, an automatic system has been provided, which is apparent from FIG. 28. For instance, to rotate the transverse stop, the switch Ip (circuit diagram of FIG. 49—$Tp_1$) must be operated. This is effected by a rotation of the switch handle 46 through 90° in the counterclockwise sense. In this switch position the stepping relay receives a pulse to operate the change-over contacts (see circuit diagram of FIG. 50, contacts $ap_1$ and $ap_2$) so that the stop barrel is rotated by one step.

The rotation of the switch handle causes also the locking means 47 (FIG. 38) to follow. Being held in locking position only by the spring 49, the slide 48 can yield to permit of a rotation of the locking means. When the rotation of the stop etc. has been performed, the operator will release the switch handle so that the same could spring back to position 0 but is stopped at 45° by the slide 48 and the locking means 47. In this position the contact $Tp_1$ (circuit diagram of FIG. 49) for effecting the rotation is already opened whereas a contact $Tp_2$ (circuit diagram of FIG. 37) for effecting the recording operation is closed. When the operation has been performed and the operation is recorded as described in sections (c) and (d), this rotation is also recorded. When the recording has been completed, the intercepting relay FR is energized, as described in sections (c) and (d) and picks up. The contact $fr_3$ is closed and the blocking magnet SR (circuit diagram of FIG. 37 and FIG. 28) is energized so that the armature 50 is attracted into the magnet SR. This causes the push rod 51 to be pulled down so that the levers 52 will pull the slide 48 sufficiently toward the side to release the locking means 47 and permit the switch handle to spring back to position 0. The auxiliary switches are then ready for the next setting operation and a wrong setting, which might be caused by leaving the switches in a set position, is avoided.

If a wrong auxiliary function has been set up by error, it must be possible to erase this wrong setting without affecting the other, correct switch settings. For this purpose, each switch has associated with it a release key 100 (FIGS. 12, 28, 29), which is urged by a spring 102 to a position of rest, in which the release pin 100 does not affect the functions of the slide 48.

Pressing the key 100 will cause the release pin 100 to displace the slide 48 sufficiently to release the locking means 47 so that the switch can spring back to its zero position.

(j) *The automatic blocking of the feed movement during the rotation of the stops or duplicating template*

If an automatic operation involves the rotation of a stop or duplicating template, the machining must not begin until the stop or duplicating template is in position, i.e., until the rotation has been completed. This blocking means is apparent from the circuit diagram of FIG. 48.

$Sch^1$ and $Sch^2$ are contactors controlling the forward and reverse rotation of the feed motor. (The arrows indicate the corresponding direction of movement of the slide rest.) Where higher powers are involved, the contactors $Sch^1$ and $Sch^2$ do not switch the motor but forward and reverse clutches, respectively; in case of a hydraulic feed movement they control the operation of control valves.

The delayed drop-out of the associated relays $Schr^1$ and $Schr^2$ enables a delay of the change-over so that a too rapid reversing of the feed motor is prevented.

Figure 49:
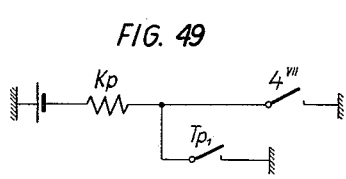
FIGS. 49 and 50 show a circuit diagram of means for the automatic setting up of auxiliary functions.

Contacts $5^I$ and $5a^I$ are contacts of the central controller and $schp_4$, $schl_4$ and $schk_4$ are contacts of the contactors for the motor for rotating the transverse and longitudinal stops and the duplicating template. When one of the contacts $5^I$ or $5a^I$ in the central controller is closed to start a feed movement and at the same time a rotation of one or more stops or/and duplicating templates, the following process will take place:

According to the circuit diagram of FIG. 49, the contact 4VII of the central controller is closed in this case to energize the stepping relay Kp for rotating the transverse stop. This relay operates the change-over contacts $kp_1$ and $kp_2$ (circuit diagram of FIG. 50) to open the contact $kp_1$ and close $kp_2$ and to establish a circuit from earth via $kp_2$–$ap_2$–$Schp_2$ to battery for energizing the contactor Schp for the motor for rotating the transverse stop. The contact $schp_4$ (circuit diagram of FIG. 48), which constitutes the auxiliary contact of this contactor, is opened so that the contactors $Sch^1$ or $Sch^2$ for the feed drive are not energized in spite of the fact that the contact $5^I$ or $5a^I$ of the central controller is closed.

Only when the stop has been rotated and the change-over contacts $ap_1$ or $ap_2$ of the stop barrel have been operated, is the contactor Schp (circuit diagram of FIG. 50) deenerigezd so that the auxiliary contact $schp_4$ (circuit diagram of FIG. 48) closes. There is now a circuit including $5^I$ or $5a^I$ (depending on the setting of the central controller) and $Sch^1$ or $Sch^2$. The feed drive is operated until the next pulse is delivered. As the contact $schp_4$ is not opened until the second switching operation has been completed (first switching operation by stepping relay Kp, circuit diagram of FIG. 49; second switching operation by contactor Schp, circuit diagram of FIG. 50) and the contactors $Sch^1$ or $Sch^2$ are energized immediately, the latter would pick up for a short time and drop out thereafter. To avoid these current surges in the contactors, motors and clutches, the contact $vr_3$ (circuit diagram of FIG. 48) is connected in series. This contact is opened during the rotation of the central controller and closes only with a drop-out delay which is longer than the time of the double switching operations of Kp and Schp.

(k) *Exact rotary adjustment of the control drum of the central controller, the stop barrels, the duplicating device ect. with automatic back-signalling and blocking arrangement*

As has been described in section (j), all movements of the slide rest or workpiece carrier are blocked until all changes have been performed. To ensure a full effect of this blocking arrangement, it appears appropriate to control the blocking means directly by the means that are affected by the change (stop barrel, multiple duplicating devices, rotary attachment, indexing heads etc.). This requirement and that for a maximum accuracy of the rotary adjustment are fulfilled by the drive mechanism shown in FIGS. 26, 27 in combination with the contact arrangement coupled with a stepping relay, (circuit diagrams of FIGS. 42 and 50). In response to a short pulse, this relay will operate to initiate the rotation or rotary adjustment and deenergize the device which performs the movement.

Figure 42:
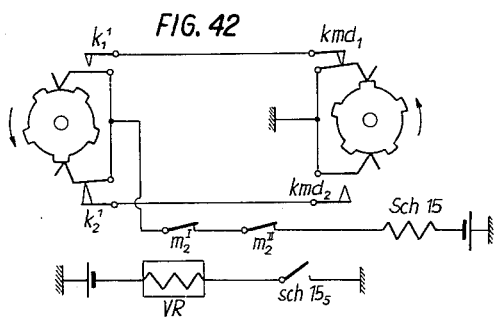
Figure 50:
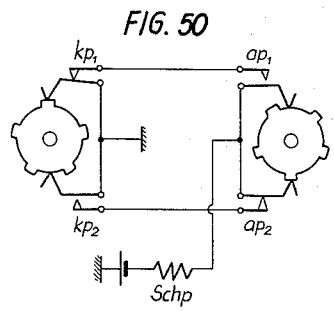

In the circuit diagram of FIG. 42, $k_1^1$ and $k_2^1$ and in the circuit diagram of FIG. 50, $kp_1$ and $kp_2$ are change-over contacts of a stepping relay. The known stepping relays comprise in their simplest form two spring sets having alternately closed and open pairs of contacts. This means when a pair of contacts 1 is closed, the pair of contacts 2 will be open. When the relay picks up, the pair of contacts 1 is opened and the pair of contacts 2 is closed. The duration of the energization required to cause the stepping relay to pick up is not significant for the function described before and is independent of time. The countercontacts are in the circuit diagram of FIG. 42 the contacts $kmd_1$ and $kmd_2$ of the switching barrel of the central controller (see also FIGS. 26, 27) and in the circuit diagram of FIG. 50 the contacts $ap_1$ and $ap_2$ of the stop barrel for the transverse stop, (e.g., the stop barrel 26p of the cross slide 27p in FIG. 23). When the stop barrel has only a small number of positions, the drive mechanism shown in FIGS. 26, 27 may be replaced by a maltese cross drive.

When a pulse is delivered to the stepping relay $K^1$ (circuit diagram of FIG. 41) or $K_p$ (circuit diagram of FIG. 49), the contact $k_1^1$ will be closed and $k_2^1$ will be opened (or $kp_2$ and $kp_1$, circuit diagram of FIG. 50). This completes a circuit from earth via $kmd_1$–$k_1^1$–$m_2^I$–$m_2^{II}$–$Sch15$ to battery (FIG. 42). $Sch15$ being the contactor for the motor for rotating the central controller, the completion of this circuit will initiate the rotation of stepping of the control barrel of the central controller. Likewise, in the circuit diagram of FIG. 50, $Sch_p$ is the contactor for the motor for rotating the stop barrel. As is apparent from FIGS. 26, 27, only a quarter turn of the camwheel 44 is used to advance the toothed wheel 45. After this quarter turn of the camwheel 44, however, the pair of contacts $kmd_1$, which is operated by the bosses 55 of the toothed wheel 45, is opened to interrupt the energization of the contactor $Sch15$ and stop the motor. Where so-called stop motors are used, which brake themselves immediately when deenergized, the rotation of the stop barrels or duplicating templates or the stepping of the central controller can be effected within very short times, which are much shorter than ½ second so that the camwheel driven by the motor does never attain its full number of revolutions, but is braked immediately after the toothed wheel 45 has been advanced. The braking time of the camwheel 44 is insignificant for an exact stepping of the toothed wheel 45 because only a quarter turn is used for advancing and three quarter turns of the camwheel 44 are used for arresting the toothed wheel 45. As a result, the camwheel 44 may be braked to vary its end position within one half turn. This braking tolerance is much greater than the total of all switching tolerances of the electrical control devices required.

As is known from precision mechanical engineering, the stopping accuracy of the drive mechanism shown in FIGS. 26, 27, may be held without difficulty below 0.01 mm. so that an exact positioning of the stop barrel, duplicating template or the control barrel of the central controller is enforced independently of the uniform function of the switching devices.

Figure 48:
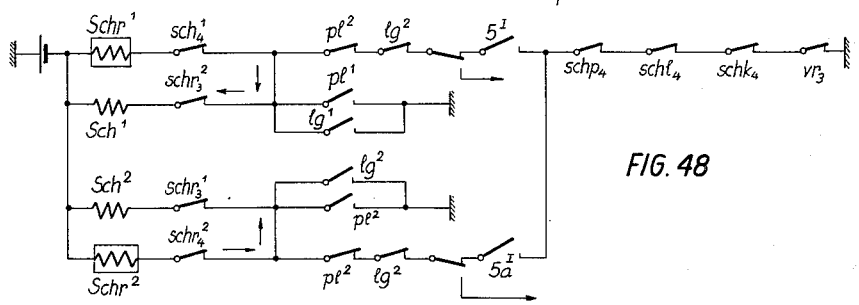

Since the turning motors can only be in operation when their associated contactors ($Sch15$, circuit diagram of FIG. 42, or $Sch_p$, circuit diagram of FIG. 50) are energized, auxiliary contacts of these contactors may be used to provide for an electric blocking of the movement of the slide rests or workpiece carriers (see circuit diagram of FIG. 48, contact $sch_{p4}$, section (j)). This provides for the automatic back-signalling and blocking arrangement.

Another blocking arrangement is shown in the circuit diagram of FIG. 42. As described in section (f), the contacts $m_2^I$, $m_2^{II}$, have been opened by the magnet MII (or magnet MI, etc.), whereas the contacts $m_1^{II}$, $m_2^{II}$ were closed. When the contacts $m_1^I$, $m_1^{II}$, etc. (see circuit diagram of FIG. 38) are closed so that the contactor $Sch14$ energizes the drive for the automatic setting-up device, (FIG. 24), the contactor $Sch15$ (circuit diagram of FIG. 42) for controlling the motor for rotating the central controller is blocked by the contacts $m_2^I$, $m_2^{II}$, so that the controller cannot be stepped as long as an operation is being recorded.

To enable the automatic performance of four as well as eight duplicating passes, a duplicating template arrangement is required which can be set without difficulty to the required number of duplicating passes. FIG. 30 shows a driving and switching disc, which permits the setting of the required number of rotary steps per rotation of the duplicating template carriers with absolutely simple means. As is shown in FIGS. 26 and 27 and described in section (k), this drive comprises also a camwheel 44 and a toothed wheel 45. The toothed wheel 45 is rigidly connected to the duplicating template carrier 56 (FIGS. 33 and 34), so that the latter will follow any rotary movement of the toothed wheel 45.

The toothed wheel 45 constitutes at the same time a contact wheel. As is known from the description in section (k), two pairs of contacts are required for controlling the intermittent rotary movement. Since the toothed wheel 45 is to be used for six different numbers of rotary steps, it comprises six contact elements 81 to 86. Each contact element consists of two parts because two change-over contacts are required. Each of these contact elements is slidably engaged by two contacts pins 87–88, which operate the associated pairs of contacts. Depending on whether break contacts or make contacts are used, the camming faces 89 and 90 may be recessed or elevated. In the present case, they are recessed. When the contact pins 87 or 88 slide over the hatched camming faces 89 or 90 during the rotation of the toothed switching wheel 45, the respective pairs of contacts will be closed and the rotary movement will be interrupted until the contact pin slides off one of the recessed camming faces. This will result in an operation of the pairs of change-over contacts at the rotating device of the duplicating template carrier. The electric operations will be described in the next section.

The present toothed wheel has, e.g., 48 teeth, because this number is an integral multiple of all numbers of duplicating passes, which must always be multiplied by two (contact element 81, 2×12; contact element 82, 2×8; contact element 83, 2×6; contact element 84, 2×4; contact element 85, 2×3; contact element 86, 2×2).

A simple barrel-type switch 7 as shown in FIGS. 31 and 32 enables the setting of the number and direction of the duplicating passes. The switch shown in FIGS. 31 and 32 permits of four profiling passes, namely, 4, 6, 8 and 12. When four profiling passes are required in the automatic sequence of operation, as has been assumed, the contact pins 87 and 88 are set, which slide on the contact element 84. In the position shown, all contact pins are disconnected because they do not engage contact faces. They are in position 0, in which the controller de-energizes itself. When the contact pin 88 is now shunted by an auxiliary contact H$t$k (circuit diagram FIG. 51) to initiate the rotary movement of the toothed wheel 45, the contact pin 88 will slide into the recess 90 of the contact element 84 to close the associated pair of contacts until the pin 88 slides off the camming face 90 of the contact element 84.

Figure 51:
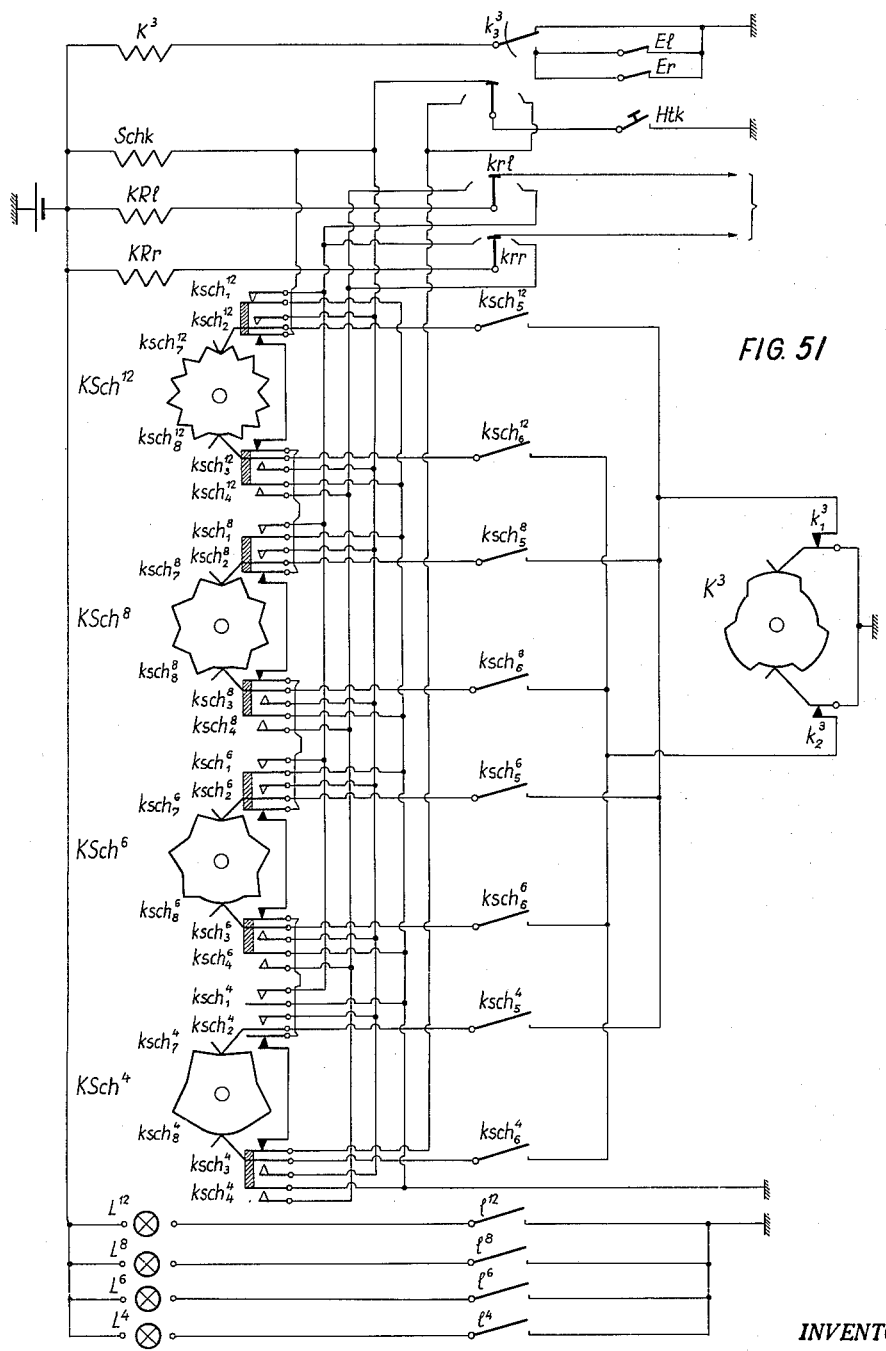
FIG. 51 is a circuit diagram of electrical means for operating a universal control device comprising a drive means as shown in FIG. 30.

This is effected when the toothed wheel has been rotated by six teeth. When the profiling operation has been performed, the associated stepping relay $K^3$ (circuit diagram of FIG. 51 is operated as described in section $k$) to apply voltage to the contact pin 87 engaging the recessed camming face 89 of the contact element 84 because the pair of contacts associated with this pin is closed. This causes another rotation by six teeth. In this position the duplicating device is returned, desirably at a somewhat accelerated speed. When the initial position has been reached, the template carrier is again rotated by six teeth or ⅛ turn to move the next profiling template into position. Then the cycle is repeated until the contact pins 87 and 88 disconnect themselves when the toothed wheel 45 is in position 0. The embodiment shown in FIGS. 31 and 32 is an example of the universal application.

(m) *The electrical operations performed by the universal control system with the aid of the drive mechanism of FIG. 30*

In the circuit diagram of FIG. 51, e.g., KR$l$ and KR$r$ are the control relays for the forward and reverse clutches of a lathe. Depending on the forward or reverse rotation of the headstock spindle, the slide rest will be moved to the left or right.

KS$ch^{4-12}$ correspond to contact elements 81–84. Contacts $ksch_1^4$ to $ksch_4^4$ and $ksch_1^{12}$ to $ksch_4^{12}$ correspond to the pairs of contacts of contact pins 88 and 87, respectively. Contacts $ksch_5^4$ to $ksch_5^{12}$ and $ksch_6^4$ to $ksch_6^{12}$ are contact elements of the switch of FIGS. 33 and 34, respectively. Pairs of contacts $k_1^3$ and $k_2^3$ are change-over contacts of the stepping relay $K^3$. S$ch$K is the contactor for the motor for rotating the duplicating device. E$l$ and E$r$ are the limit contacts 76, 77, respectively, of the duplicating device of FIGS. 33 and 34.

When the switch of FIG. 31 is in position 0, the clutch relays KR$l$ and KR$r$ are connected to the normal control levers of the lathe. At the same time, all control connections of the duplicating device (see also the diagram of FIG. 32) are disconnected. The lathe can be operated as a normal machine tool without special attachments.

When four profiling passes are now to be performed automatically, as described in section (l), and these passes are to be performed from right to left, the switch of FIG. 31 is moved to the left to position "4." As is apparent from the diagram of FIG. 32, the contacts $ksch_5^4$ and $ksch_6^4$ are closed so that a circuit is completed from earth via the change-over contacts $k_1^3$ or $k_2^3$ of the stepping relay, the switch contact $ksch_5$ or $ksch_6^4$, the contact $ksch_2^4$ or $ksch_3^4$, the pairs of contacts associated with contact pins 87, 88, the contact element 84 (FIG. 30) and the contactor S$ch$k for the rotating motor as far as contacts are closed. When the toothed switching wheel 45 (FIG. 30) is in position 0, however, the pairs of contacts $ksch_2^4$ and $ksch_3^4$ are open. To initiate a rotary movement, the contactor S$ch$k of the rotating motor must be energized for the time required to effect one revolution of the camwheel 44. This may be effected with the aid of the auxiliary contact H$t$K, which consists of a push button contact. To prevent an interference of the manual action with the automatic sequence of operations, the connection from the auxiliary contact H$t$K to the contractor S$ch$k is established through pairs of contacts $ksch_7^4$, $ksch_8^4$ etc., i.e., through all break contacts associated with the contact pins 87 and 88 (FIG. 30), so that the auxiliary contact can only become effective when the toothed contact wheel 45 is in position 0 at the time when an automatic duplicating cycle is initiated by the barrel-type switch. For non-automatic duplicating work and during the setting-up of the machine, the rotation of the duplicating device can be directly initiated by the push button H$t$K.

As is apparent from FIG. 30, the contact pin 88 slides on the selected contact recess 90 when the toothed contact wheel 45 has been rotated by half a tooth. This enables the pairs of contacts $ksch_2^4$ and $ksch_3^4$ to operate the pairs of contacts $k_1^3$ and $k_2^3$ of the stepping relay so that the automatic rotation of the duplicating device is released at the end of a profiling operation. At the same time, the pairs of contacts $ksch_1^4$ and $ksch_4^4$ are operated, which energize or deenergize the clutch relays for the forward or reverse movement (KR$l$ or KR$r$) by means of the switch contact $krl$ or $krr$, depending on the selection made by the duplicating device. Now only the stepping relay $K^3$ must be operated to complete the automatic duplicating operation. This relay is controlled by contacts E$l$ and E$r$, which are operated by means of contact bosses 76 and 77 and the sensing lever 58. When an end position of a duplicating operation has been reached, the stepping relay receives a pulse and then initiates the rotation of the duplicating device, as has been described.

(n) *Electrical operations performed by the universal control system with the aid of the drive mechanism of FIG. 30 where a central controller is used for an automatic sequence of operation*

Numerous duplicating passes, as might be required, e.g., in thread cutting, would necessitate an excessive number of control positions of the central controller and controllers for a very large number of positions would be required. Such controllers would be uneconomical for simple work. For this reason, the control system illustrated in FIG. 30 appears suitable also in such cases. The application is again the same as in a simple lathe. In view of the automatic sequence of operations, the auxiliary pulse generated by the manual key must be automatically obtained.

Likewise, a pulse to rotate the central controller must be delivered at the end of the multiple duplicating work.

Figure 52:
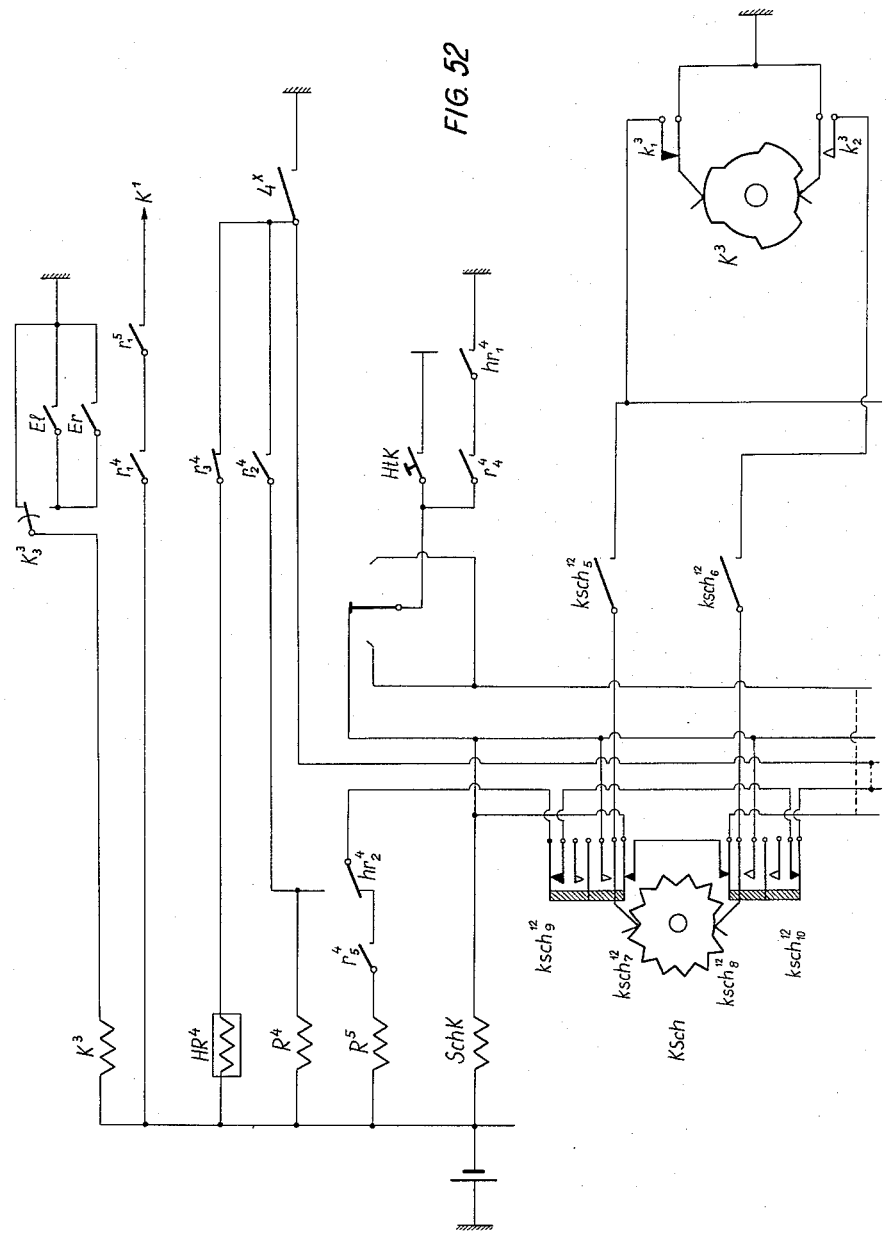
FIG. 52 is a circuit diagram of electrical means for operating a universal control device comprising a drive means as shown in FIG. 30 and a central controller for an automatic sequence of operation.
Figure 53:
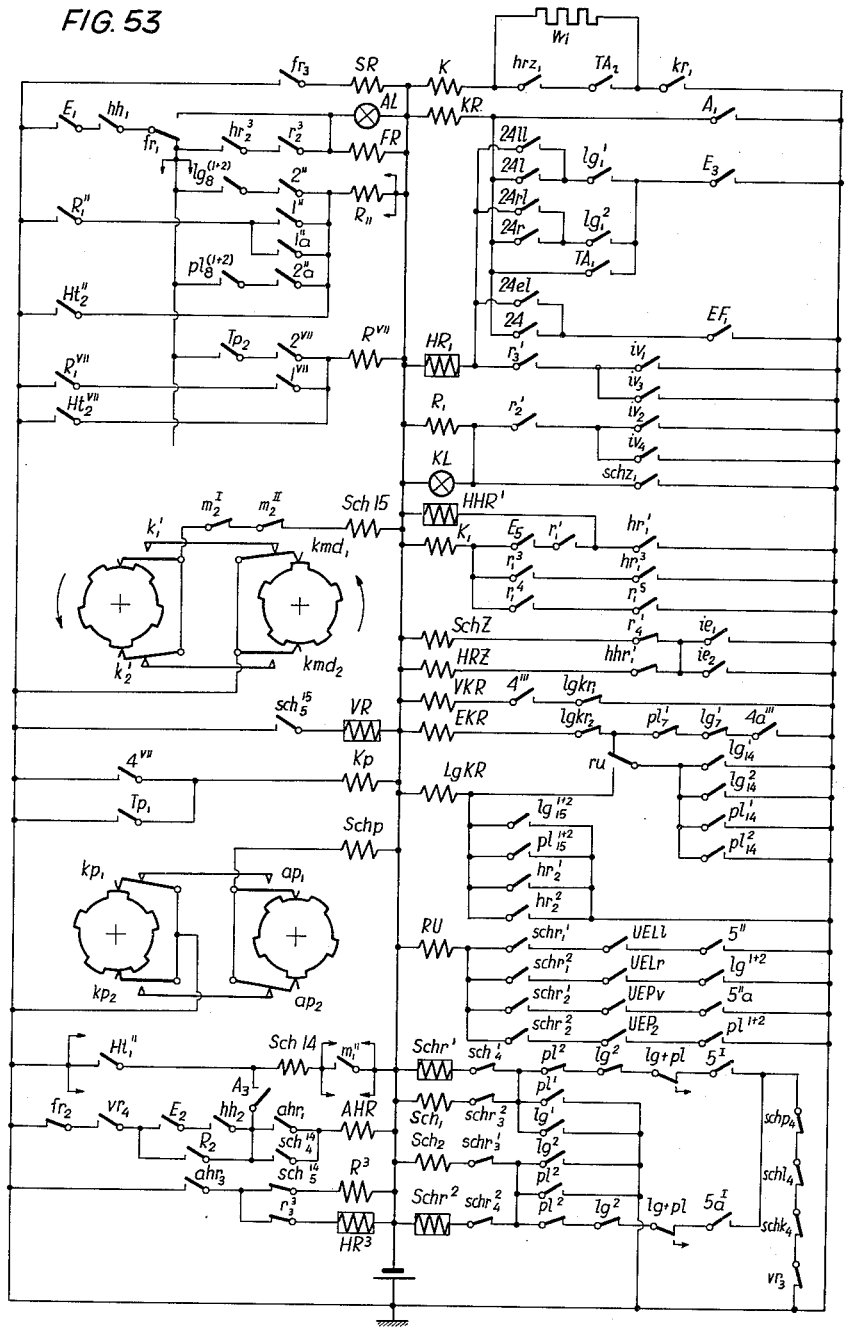
FIG. 53 is an overall circuit diagram embodying circuits illustrated in FIGS. 35 to 52.

The circuitry meeting these requirements is shown in the circuit diagram of FIG. 52. For multiple duplicating work, the central controller closes the contact $4^X$ to energize the auxiliary pulse relay $HR^4$. This relay picks up and closes its auxiliary pulse contact $hr_1^4$ and at its changeover contact $hr_2^4$ energizes the pulse relay $R^4$ in a circuit from the earth contact $4^X$ of the central controller via the break contacts $ksch_9^{12}$, $ksch_{10}^{12}$, $ksch_9^8$ etc. associated with the contact pins 87 and 88 and the operated contact $hr_2^4$ of the auxiliary pulse relay.

When the pulse relay $R^4$ picks up, the auxiliary pulse, which can be generated by the manual key HtK in the case of manual control, is now generated by means of the pair of contacts $r_4^4$ of relay $R^4$ and the closed contact $hr_1^4$. The duration of this auxiliary pulse is not only limited by the break contacts $ksch_7^{12}$, $ksch_8^{12}$, $ksch_7^8$ etc., but also by the drop-out delay of the auxiliary pulse relay because the pulse relay $R^4$ interrupts at its switch contact $r_3^4$ the energization of the pulse relay $HR^4$. This relay $HR^4$ remains deenergized during the multiple duplicating work and will not be reenergized until the contact $4^X$ of the central controller has been opened.

To cause a rotation of the central controller when the multiple duplicating work has been completed, a pulse must be delivered at this time. To this end, the pulse relay $R^5$ and the break contacts $ksch_9^{12}$, $ksch_{10}^{12}$, $ksch_9^8$, etc. are provided, which are closed in position 0 of the toothed contact wheel 45. In this position, the auxiliary pulse relay $HR^4$ is deenergized because the contact $r_3^4$ is open so that the contact $hr_2^4$ is in position of rest and ready to energize the pulse relay $R^5$. The contact $r_5^4$ is closed too, because the relay $R^4$ picks up as long as contact $4^X$ of the central controller remains closed. In this position 0, the second pulse relay $R^5$ picks up to close its contact $r_1^5$. Since the contact $r_1^4$ of the first pulse relay $R^4$ is closed too, as has been described, a current will flow through the stepping relay $K^1$ to initiate the rotation of the central controller, to open the contact $4^X$ of the central controller and to interrupt the energization of relay $R^4$. As a result, $R^5$ is deenergized too and the arrangement is ready to begin the next operation.

What I claim is:

1. A machine which comprises a frame, machine element means mounted on said frame for movement relative thereto, a plurality of drive units carried by said frame and operatively connected to said machine element means and energizable to impart predetermined motions to said machine element means, and a control apparatus comprising two control members mounted to be relatively rotatable about an axis, one of said control members carrying a plurality of contact actuating cams arranged in a plurality of rows extending in a peripheral direction with respect to said axis and in a plurality of cross-rows extending transversely to said peripheral direction and equally spaced apart, each of said cams being mounted on said one control member to be movable relative thereto between an operative position and an inoperative position, a stepping drive energizable to effect a relative rotation of said control members in said peripheral direction in steps which correspond to the spacing of said cross-rows of cams, whereby said cross-rows of cams are successively moved to a control position, the other of said control members carrying a plurality of contact means arranged in a row which is parallel to and adjacent to the cross-row of cams which is in said control position, each of said contact means being movable to an actuated position and biased toward the non-actuated position and associated with one of said rows of cams; each of said cams of the cross-row of cams which is in said control position being arranged to move the contact means associated with its row to its actuated position when said cam is in said operative position and to permit said contact means to move to its non-actuated position when said cam is in said inoperative position, each of said cross-rows of cams being arranged to be moved by the operation of said stepping drive to an adjusting position relative to said other control member, said control apparatus further comprising a plurality of electromagnetic cam adjusting means, each of which is associated with one of said rows of cams and disposed adjacent to that cam of said row which belongs to a cross-row of cams which is in said adjusting position, each of said cam adjusting means being individually energizable to move said adjacent cam to said operative position thereof, a selector switch manually movable between a manual position and an automatic position, a plurality of manually operable drive control means, each of which is associated with one of said drive units and one of said cam adjusting means and arranged to jointly energize the same when said selector switch is in said manual position to impart a predetermined motion to said machine element means and to record said motion in said one control member by the adjustment of the cams of the cross-row of cams which is in said adjusting position, each of said contact means being associated with the drive unit which is associated with the manual drive control means associated with the cam adjusting means which is associated with the same row of cams as said contact means, each of said contact means in said actuated position being arranged to cause the energization of the drive unit associated with it when said selector switch is in said automatic position, so that with said selector switch in said automatic position said drive units are arranged to impart to said machine element means the motion recorded by the adjustment of the cams of the cross-row of cams which is in said control position.

2. A machine as set forth in claim 1, which comprises a plurality of clutches, each of which is associated with one of said electromagnetic cam adjusting means and arranged to engage and couple said cam adjusting means to said adjacent cam in response to energization of said associated cam adjusting means and to disengage and disconnect said associated cam adjusting means from said adjacent cam when said associated cam adjusting means is deenergized.

3. A machine as set forth in claim 2, in which each of said cams is angularly movable between said operative and inoperative positions thereof and each of said clutches comprises a rotatable clutch member which is axially movable between a retracted position in which it is disconnected from said adjacent cam and an extended position in which it is coupled to said adjacent cam and rotatable in a cam adjusting direction to move said cam from said inoperative position to said operative position, said cam adjusting means further comprising an electromagnet arranged to move said clutch member to said extended position in response to energization of said cam adjusting means, an electric motor, a transmission connected to said clutch member and operable by said electric motor to intermittently rotate said clutch member in said cam adjusting direction in steps corresponding to the angle required to move the cam from its inoperative position to its operative position, a make contact actuable by said electromagnet, a relay connected in series with said make contact, and a make contact controlled by said relay and in circuit with said electric motor.

4. A machine as set forth in claim 3, which comprises a main switch contact and a selector switch contact arranged to be closed in said manual position of said selector switch, and in which each of said contact means comprises a pair of contact springs constituting a make contact and each of said cam adjusting means comprises an energizing circuit including in series a make contact actuable by the associated drive control means, said pair of contact springs, said main switch contact and said selector switch contact.

5. A machine as set forth in claim 3, in which said relay has connected in series with it a first selector switch contact arranged to be closed in the manual and automatic positions of said selector switch, a second selector switch contact arranged to be closed in said manual position of said selector switch, and a main switch contact.

6. A machine as set forth in claim 1, in which one of said cam adjusting means comprises an electromagnet and which comprises a stepping drive circuit for energizing said stepping drive, a break contact actuable by said electromagnet and connected in series in said stepping drive circuit, a make contact connected in series in said stepping drive circuit, a stepping relay for actuating said make contact, and position contacts in circuit with said stepping relay and arranged to be closed in a predetermined position of said machine element means relative to said frame.

7. A machine as set forth in claim 1, which comprises an intercepting relay in circuit with a selector switch contact arranged to be closed when said selector switch is in said manual position, a break contact actuable by said intercepting relay, and a main switch make contact, said intercepting relay being also included in a holding circuit including a holding contact actuable by said intercepting relay, a further selector switch contact arranged to be closed when said selector switch is in said manual position, and a further main switch make contact, said stepping drive being energizable by a circuit which includes a break contact actuable by said intercepting relay.

8. A machine as set forth in claim 7, which comprises an electrically operable indicator connected in parallel to said intercepting relay.

9. A machine as set forth in claim 7, which comprises a plurality of erasing circuits each of which is adapted to energize one of said cam adjusting means and includes a make contact arranged to be actuated by said adjacent cam in said operative position, said selector switch being movable to an erasing position to establish said erasing circuits and each of said cam adjusting means being arranged to adjust said adjacent cam from said operative to said inoperative position in response to energization by said erasing circuit.

10. A machine as set forth in claim 9, which comprises erasing contact means arranged to be closed unless all said cams are in said inoperative position and a circuit including said erasing contact means and arranged to energize said stepping drive when said erasing contact means are closed and said selector switch means is in said erasing position.

11. A machine as set forth in claim 7, which comprises an intercepting relay make contact actuable by said intercepting relay, an electromagnet in series with said intercepting relay make contact and arranged to be energized when said selector switch is in said automatic position and said intercepting relay make contact is closed, said manual drive control means being operable from an inoperative position to an operative position to energize said drive units and cam adjusting means, and releasable locking means adapted to lock said manual drive control means in said operative position and arranged to be released by said electromagnet when the same is energized.

12. A machine as set forth in claim 1, in which each of said cam adjusting means comprises an electric motor energizable for adjusting said adjacent cam, and a motor relay for controlling the energization of said electric motor in response to the energization of said cam adjusting means, said machine comprising further a stepping drive circuit for energizing said stepping drive, a pulse circuit, a pulse make contact connected in said pulse circuit to control the energization thereof, an auxiliary relay energizable for actuating said pulse make contact, a break contact connected in series with said pulse make contact in said pulse circuit and actuable by said motor relay, said motor relay being connected in series with a selector switch contact arranged to be closed in the automatic position of said selector switch, an interrupter relay make contact, and an intercepting relay break contact, said machine further comprising a stepping relay included in said pulse circuit and energizable to cause said stepping drive circuit to be energized, an interrupter relay arranged to be energized in said manual position of said selector switch, a make contact actuable by said stepping relay, and an intercepting relay arranged to be energized when said selector switch is in said manual position.

13. A machine as set forth in claim 1, in which said cam adjusting means comprise an intermittent transmission and which comprises a switch gear for controlling said stepping drive, said switch gear comprising changeover contacts operable by said intermittent transmission.

14. A machine as set forth in claim 1, in which said stepping drive is rotatable and which comprises a stop barrel rotatable in unison with said stepping drive and carrying pulse contact means, said machine element means carrying pulse contact means arranged to cooperate with said pulse contact means of said stop barrel in a predetermined position of said machine element means relative to said frame, a pulse circuit arranged to be closed in response to the cooperation of said pulse contact means, and a stepping drive circuit for energizing said stepping drive in response to the energization of one of said cam adjusting means when said selector switch is in said manual position and in response to the energization of said pulse circuit when said selector switch is in said automatic position.

15. A machine as set forth in claim 1, in which each of said cam adjusting means has a push button switch which is operable to energize said cam adjusting means and said stepping drive and to block the energization of said cam adjusting means by said manual drive control means.

16. A machine as set forth in claim 1, which comprises step initiating means for energizing said stepping drive for one step in predetermined positions of said machine element means relative to said frame.

17. A machine as set forth in claim 16, in which said step initiating means comprise a differential vernier for sensing said machine element means in at least one of said predetermined positions.

References Cited by the Examiner

UNITED STATES PATENTS

| | | | |
|---|---|---|---|
| 2,475,245 | 7/49 | Leaver et al. | 318—162 |
| 2,537,770 | 1/51 | Livingston et al. | 318—162 |
| 2,575,792 | 11/51 | Bullard et al. | |
| 2,710,934 | 6/55 | Senn | 318—162 |
| 3,011,110 | 11/61 | Yu-Chi Ho et al. | 318—162 X |
| 3,011,113 | 11/61 | Jerue et al. | 318—162 |
| 3,024,610 | 3/62 | Ulman | 318—162 X |

FOREIGN PATENTS

| | | |
|---|---|---|
| 1,114,501 | 12/55 | France. |

WILLIAM W. DYER, Jr., *Primary Examiner.*

LEON PEAR, *Examiner.*